(12) United States Patent  
Pietra

(10) Patent No.: US 8,893,661 B2  
(45) Date of Patent: Nov. 25, 2014

(54) PORTABLE, BEDSIDE-MOUNTABLE, PET BED APPARATUS

(75) Inventor: Barbara M. Pietra, Laguna Beach, CA (US)

(73) Assignee: Sea Glass, Inc., Laguna Beach, CA (US)

( * ) Notice: Subject to any disclaimer, the term of this patent is extended or adjusted under 35 U.S.C. 154(b) by 418 days.

(21) Appl. No.: 13/526,289

(22) Filed: Jun. 18, 2012

(65) Prior Publication Data

US 2013/0125827 A1    May 23, 2013

Related U.S. Application Data

(63) Continuation-in-part of application No. 12/708,375, filed on Feb. 18, 2010, now Pat. No. 8,230,818.

(60) Provisional application No. 61/571,526, filed on Jun. 30, 2011.

(51) Int. Cl.
*A01K 1/035* (2006.01)
*A47D 7/04* (2006.01)

(52) U.S. Cl.
USPC ............... 119/497; 119/28.5; 119/485; 5/95

(58) Field of Classification Search
USPC ............... 119/28.5, 485, 753, 497, 771; 5/95
See application file for complete search history.

(56) References Cited

U.S. PATENT DOCUMENTS

| | | |
|---|---|---|
| 542,759 A | 7/1895 | Froehlich |
| 814,538 A | 3/1906 | Grigsby |
| 961,669 A | 6/1910 | Atkinson |
| 1,138,451 A | 5/1915 | Bugele et al. |
| 1,171,029 A | 2/1916 | Dutour |
| 1,200,830 A | 10/1916 | Goss |
| 1,267,244 A | 5/1918 | McMillan |
| 1,495,988 A | 6/1924 | Catino |
| 2,763,014 A | 9/1956 | Luger |
| 3,402,409 A | 9/1968 | Kain |
| 3,482,810 A | 12/1969 | Bailey |
| 4,512,286 A * | 4/1985 | Rux ............................. 119/771 |
| 4,726,083 A | 2/1988 | Hoshall |
| 5,148,561 A | 9/1992 | Tharalson et al. |
| 5,161,484 A | 11/1992 | Duane |
| 5,172,435 A | 12/1992 | Griffin et al. |
| 5,282,439 A | 2/1994 | Oaks |
| 5,293,655 A | 3/1994 | Van Winkle et al. |
| 5,709,164 A | 1/1998 | Batterton |
| 6,546,575 B2 | 4/2003 | De Angelo |
| 6,588,366 B1 | 7/2003 | Ranson et al. |
| 6,862,757 B2 | 3/2005 | Andriunas et al. |
| 7,216,379 B2 | 5/2007 | Tharalson et al. |
| RE40,754 E | 6/2009 | Morton |
| 7,584,514 B1 | 9/2009 | Salas |
| 7,712,437 B2 | 5/2010 | Leung |

(Continued)

*Primary Examiner* — Yvonne Abbott

(74) *Attorney, Agent, or Firm* — Myers Andras LLP; Joseph C. Andras

(57) ABSTRACT

A portable pet bed apparatus is provided that can be selectively side mountable to a bed assembly. The pet bed apparatus includes a carrier device that defines a bedding space thereof sized and dimensioned to accommodate a domestic pet therein. The pet bed apparatus further includes a mounting assembly having a horizontal portion and a vertical portion that lies closely adjacent to the bed assembly, and a connector assembly on the side of the carrier device for detachably connecting the carrier device to the vertical portion of the mounting assembly. The carrier device can be removed from the mounting assembly, which enables independent functionality as a pet carrier.

7 Claims, 26 Drawing Sheets

(56) References Cited

U.S. PATENT DOCUMENTS 8,091,513 B1 * 1/2012 Garcia .......................... 119/771
8,381,333 B2 * 2/2013 Friedman ........................... 5/95
2004/0078895 A1 * 4/2004 Elling ................................ 5/95
2007/0283898 A1 * 12/2007 Madison ....................... 119/496

* cited by examiner

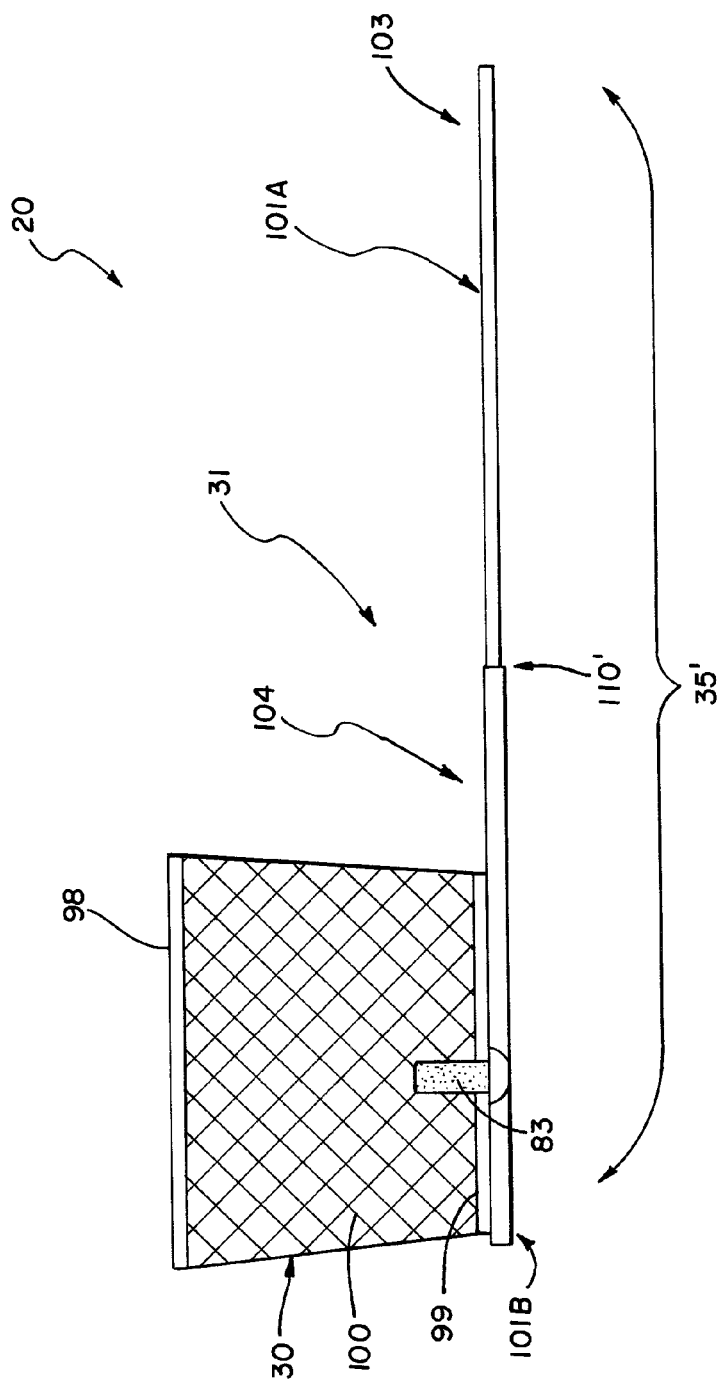

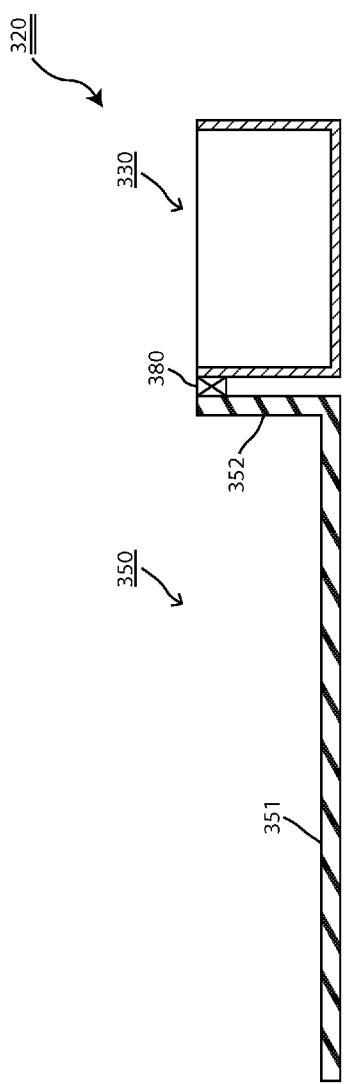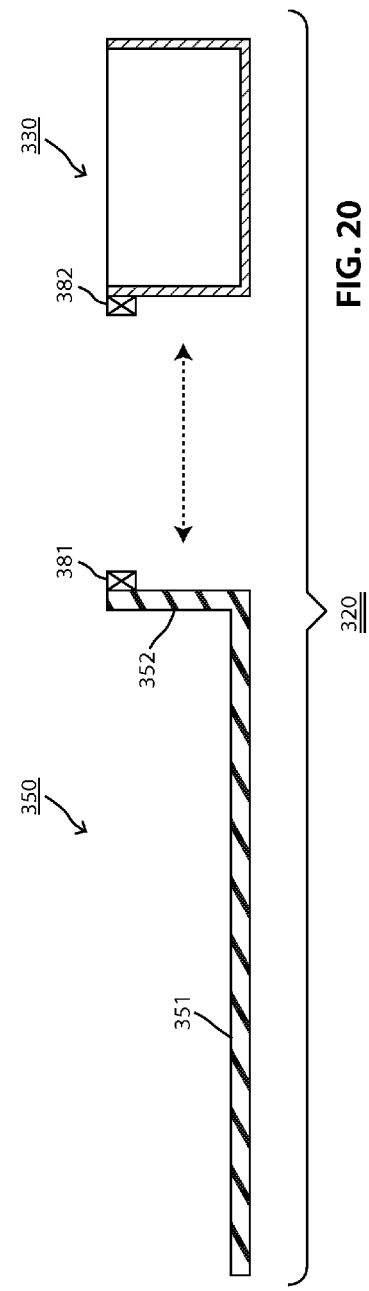

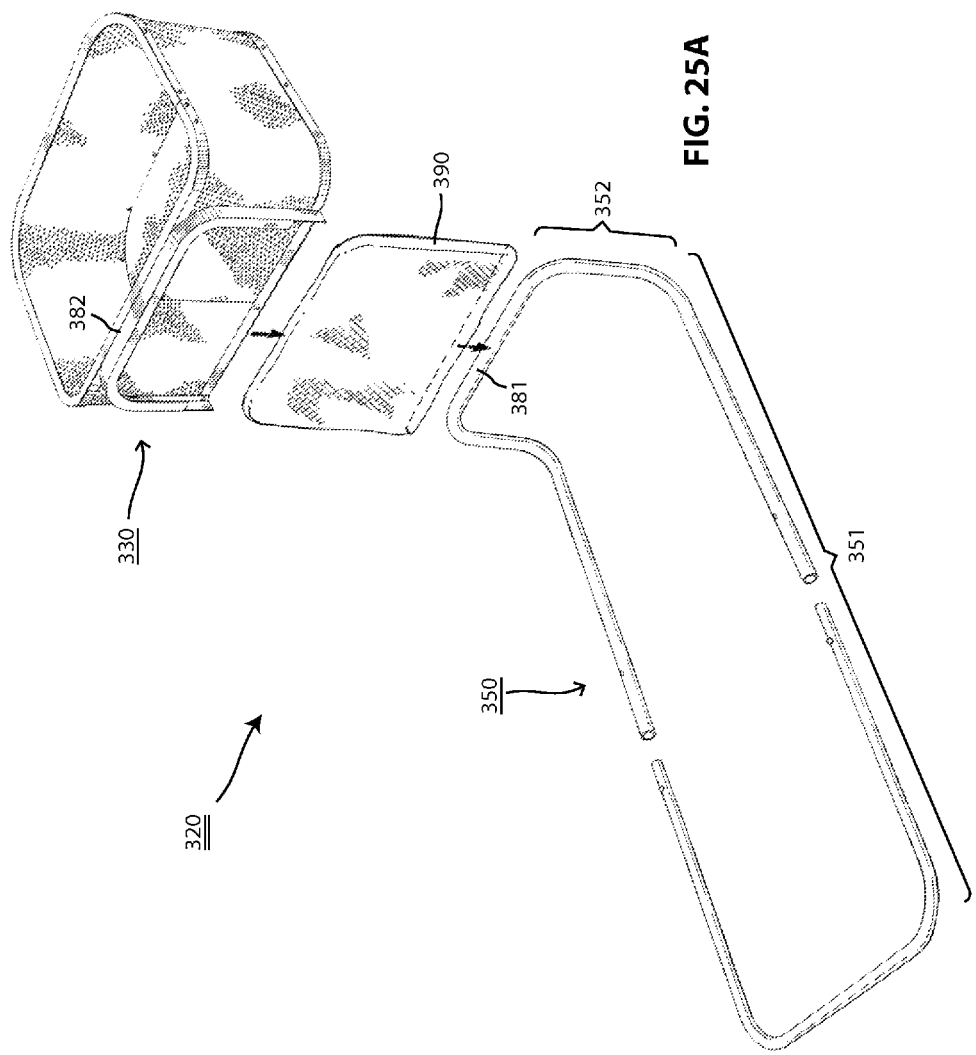

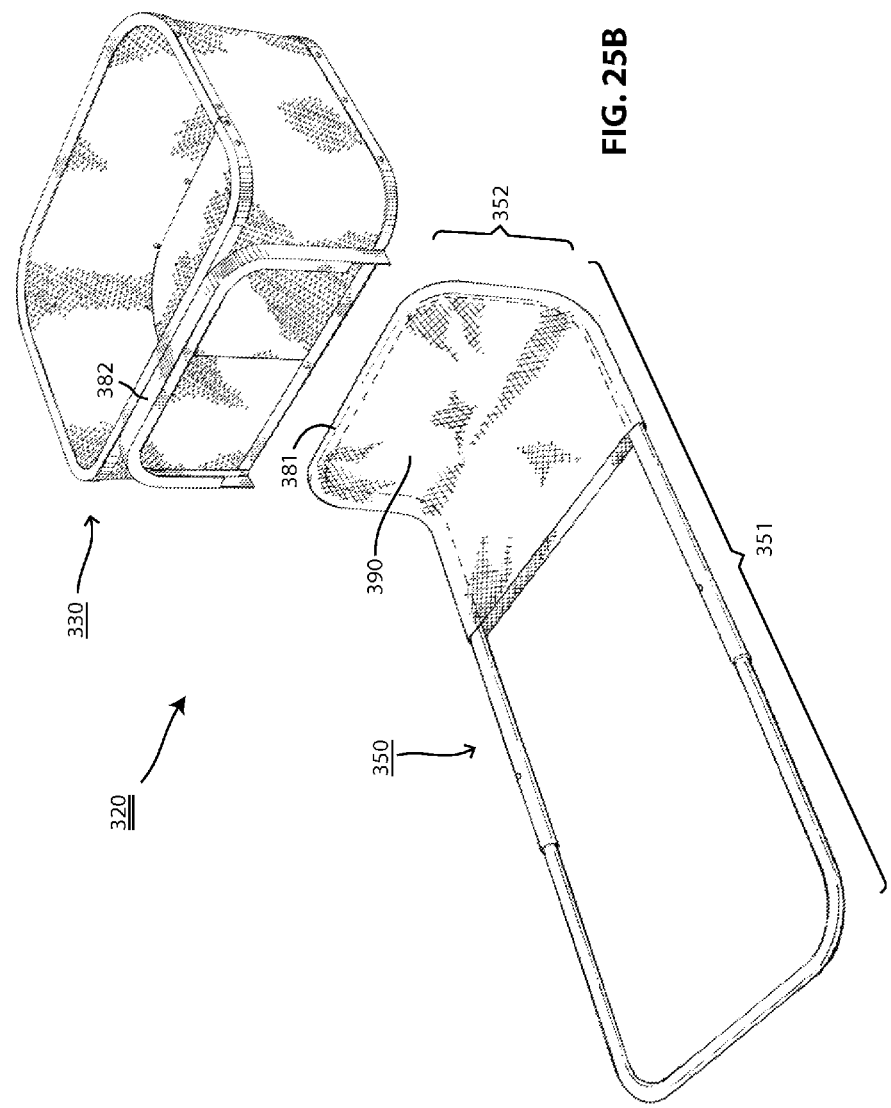

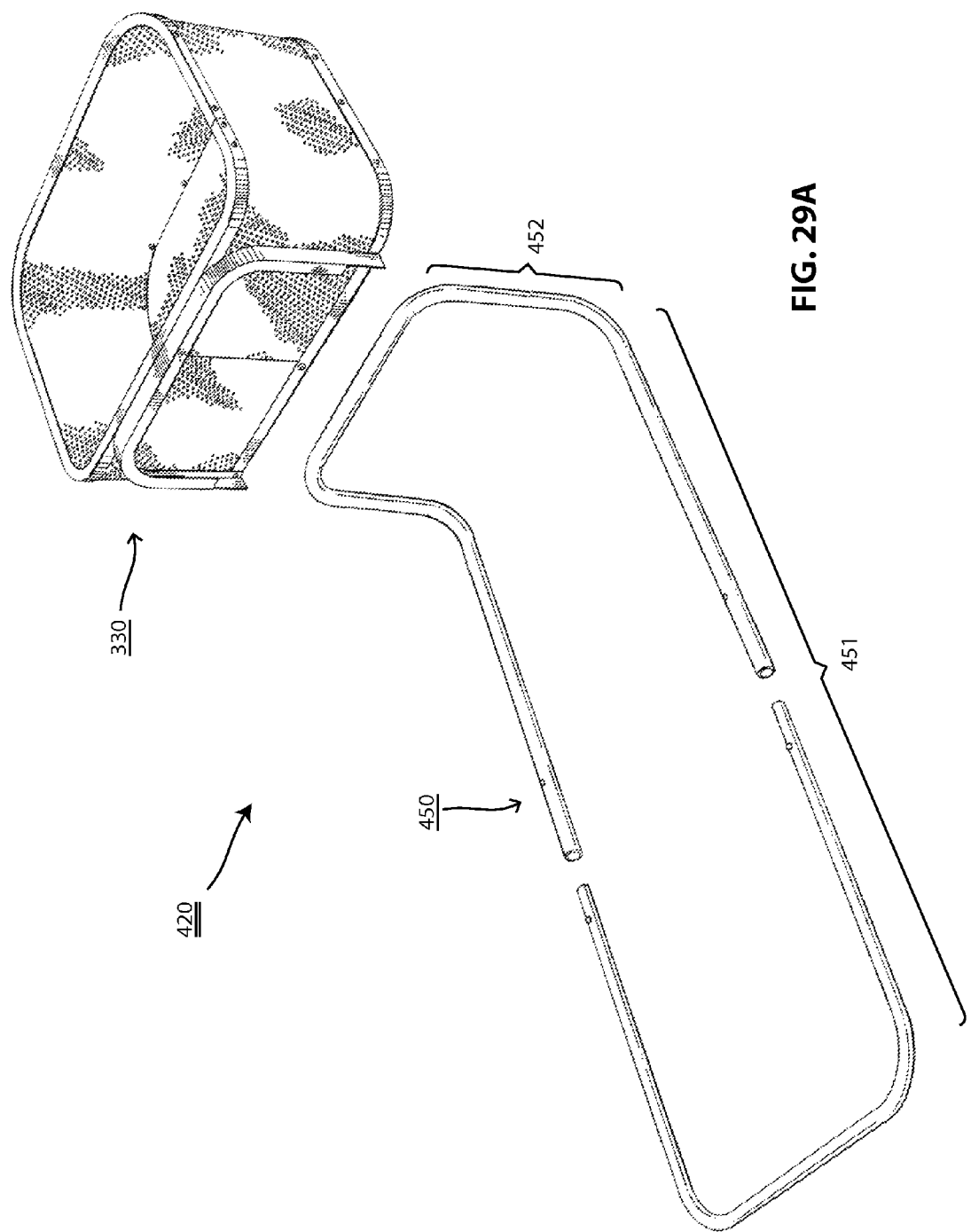

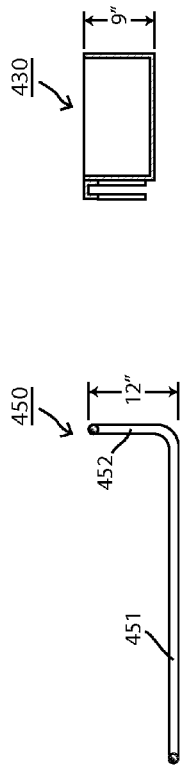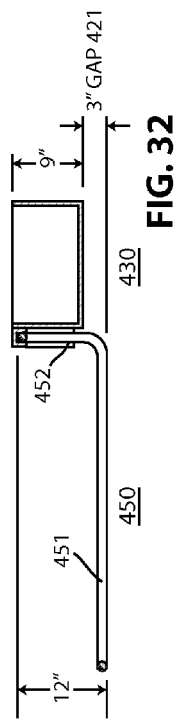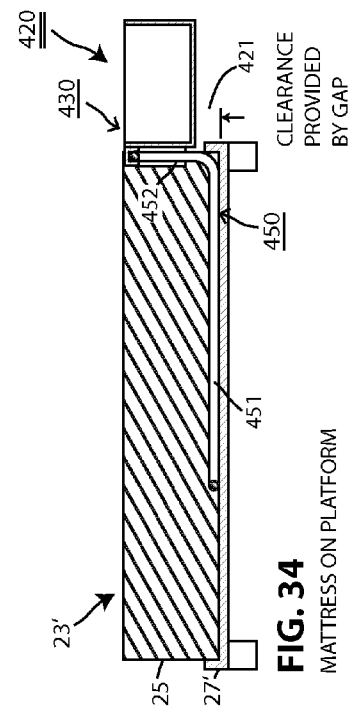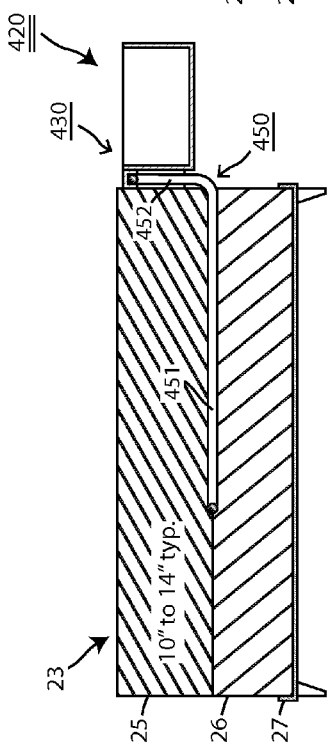

PORTABLE, BEDSIDE-MOUNTABLE, PET BED APPARATUS

CROSS-REFERENCES TO RELATED APPLICATIONS

The application is a continuation in part of U.S. patent application Ser. No. 12/708,375, filed Feb. 18, 2010, now pending, and claims the benefit of provisional patent application No. 61/571,526, filed on Jun. 30, 2011.

BACKGROUND OF THE INVENTION (1) Field of the Invention

The present invention relates generally to in-home bedding for domestic pets, and more particularly relates to a portable pet bed apparatus mountable to a side of a conventional bed.

(2) Description of the Related Art

It is quite common for pet owner's to share their beds with their beloved pets, especially cats and dogs. Such bed sharing, however, is not true for every pet owner, whether they are allergic to pet dander, or whether they simply do not wish to. Such non-sharing of the owner's bed may especially be true when traveling or when not sleeping in one's own bed.

Accordingly, it is therefore highly desirable to provide an improved pet bed apparatus that can be side mounted to a bed assembly.

BRIEF SUMMARY OF THE INVENTION

In particular, this present inventive pet bed apparatus configured for cantilever supportive retainment at an interface between two opposed, substantially adjacent, opposed surfaces of a structure (such as a conventional bed). The pet bed apparatus includes a carrier device defining a bedding space sized and dimensioned to accommodate a domestic pet therein. The pet bed apparatus further includes a mounting assembly that includes a support platform, coupled to the carrier device, and a frame assembly, configured for selective manipulation between a stowed position and a deployed position. In the deployed position, the frame assembly is sufficiently extended from a side portion of the carrier device, to enable selective friction-fit insertion of at least a portion of the frame assembly into the interface, between the opposed surfaces, to an inserted position. In this position, the pet bed apparatus is cantilever mounted to a side wall of the structure.

In accordance with the present invention, the carrier device is configured to function as a conventional carrier transport, for enclosed transport of the occupant pet, and can be removed from the mounting assembly. Accordingly, a portable carrier device is provided that is capable of simplistic conversion from a pet carrier to a side mounted pet bed apparatus. By manipulating the frame assembly to the deployed position, portions of the frame assembly can be inserted into the structure interface (e.g., between an upper mattress and a lower mattress support) toward the inserted position). Consequently, the carrier device can be positioned directly adjacent to, as well as at a similar height as, the upper mattress of the bed assembly, enabling the pet occupant to nearly share a sleeping arrangement with their owner without having their pet directly occupy the owner's same bed assembly.

In one specific embodiment, the frame assembly includes a pair of mounting legs, laterally spaced apart from one another. The mounting legs are configured to telescopically translate between the stowed position to the deployed position.

In another configuration, however, the mounting legs are configured to hingedly "fold" between the stowed position and the deployed position.

In another specific embodiment, the carrier device is configured to removably mount to the mounting assembly. This enables separation of the carrier device so that it can independently function as a conventional pet carrier.

Another specific embodiment provides a mounting assembly that includes a support platform to vertically support a bottom portion of the carrier device thereatop. The support platform is plate-shaped, and includes a lip portion configured for insertion into the interface, between the two opposed surfaces to, in the inserted position.

Yet another embodiment provides a pet bed apparatus that further includes a latching mechanism cooperating between the carrier device and the mounting assembly for removable mounting to one another. This latching mechanism is selected from the group consisting essentially of VELCRO® (i.e. hook and loop) fasteners, VELCRO® straps, snaps, latches, belts, buckles, and metal loops through which VELCRO® straps will be attached.

In still another configuration, a telescoping support leg is included that extends from the support platform to the ground for additional vertical support of the pet bed apparatus when oriented in the inserted position. This support leg preferably articulates between a stored position, generally oriented adjacent to and against a bottom of the support platform, and a support position, generally oriented perpendicular to the support platform bottom.

To provide enclosed transport, a cover device is included that is configured to selectively mount to the carrier device in a manner substantially covering an upper opening thereof into the bedding space.

In another aspect of the present invention, a portable pet bed apparatus is provided that is selectively side mountable to a bed assembly. The bed assembly includes an upper mattress supported atop a mattress support at an interface formed between a bottom surface of the upper mattress and an upper surface of the mattress support. The pet bed apparatus includes a carrier device having a bottom wall and a plurality of side walls upstanding from a peripheral edge of the bottom wall. The carrier device further defines an upper opening extending into a bedding space thereof sized and dimensioned to accommodate a domestic pet therein. A mounting assembly is included having a support platform configured to vertically support the bottom wall of the carrier device thereatop, and a frame assembly configured to removably side mount to the bed assembly. Such side mount positioning the carrier device substantially adjacent to the upper mattress. The apparatus further includes a latch mechanism disposed between the carrier device and the mounting assembly for selective coupling and decoupling therebetween, enabling independent operation of the carrier device.

In one specific embodiment, the frame assembly is coupled to the support platform for selective manipulation between a stowed position and a deployed position. In the latter deployed position, leg portions of the frame assembly are sufficiently extended from an abutting side wall of the carrier device, to enable selective friction-fit insertion of at least a portion of the frame assembly and at least a lip portion of the support platform into the interface. By positioning the leg portions and the lip portion between the upper mattress and the mattress support, to an inserted position, the carrier device can be cantilever mounted and supportively retained to a side wall of the bed assembly.

BRIEF DESCRIPTION OF THE DRAWINGS

The assembly of the present invention has other objects and features of advantage which will be more readily apparent

Figure 1:
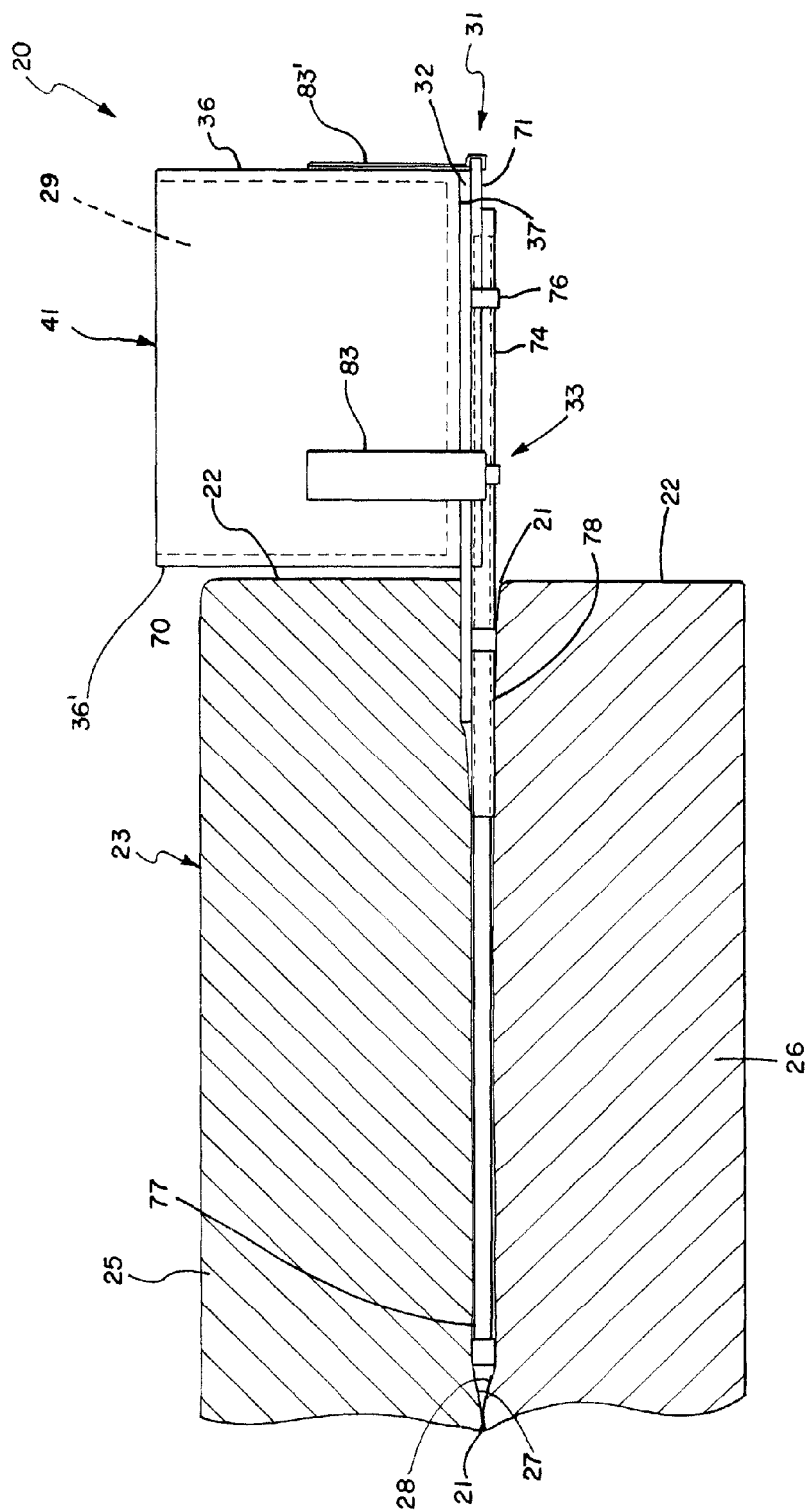

3 from the following description of the best mode of carrying out the invention and the appended claims, when taken in conjunction with the accompanying drawings, in which:

FIG. 1 is a side elevation view, in partial cross-section, of a pet bed apparatus constructed in accordance with the present invention, and mounted between the mattresses of a bed in an inserted position.

Figure 2:
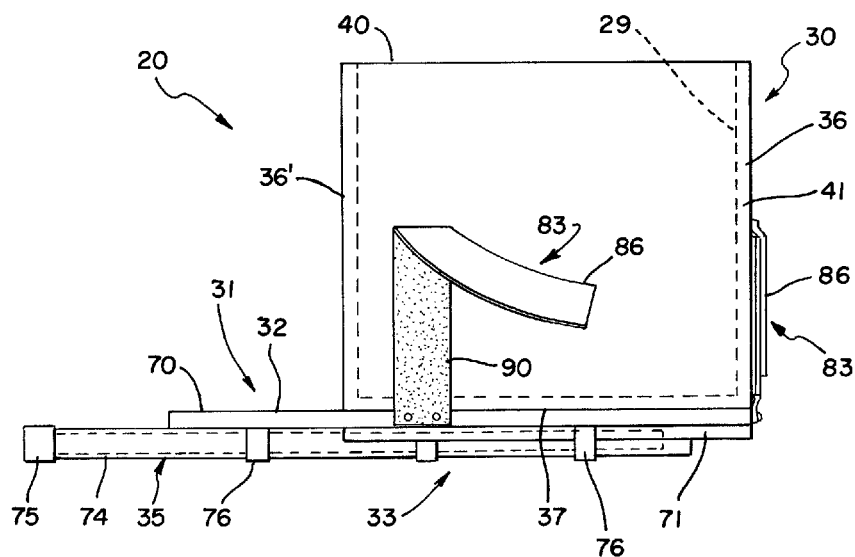

FIG. 2 is a side elevation of the pet bed apparatus of FIG. 1, illustrating a frame assembly thereof in a stowed position.

Figure 3:
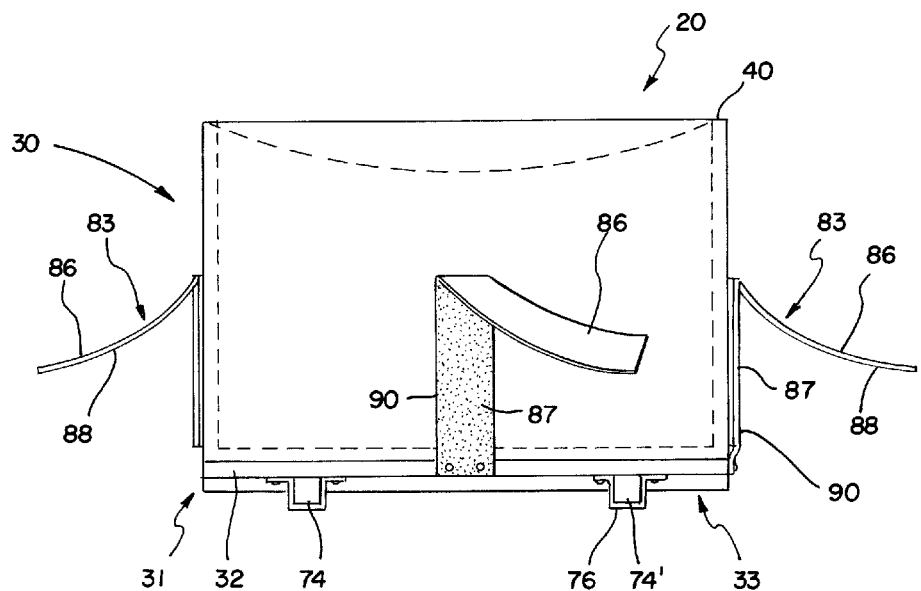

FIG. 3 is a rear elevation view of the pet bed apparatus of FIG. 2.

Figure 4:
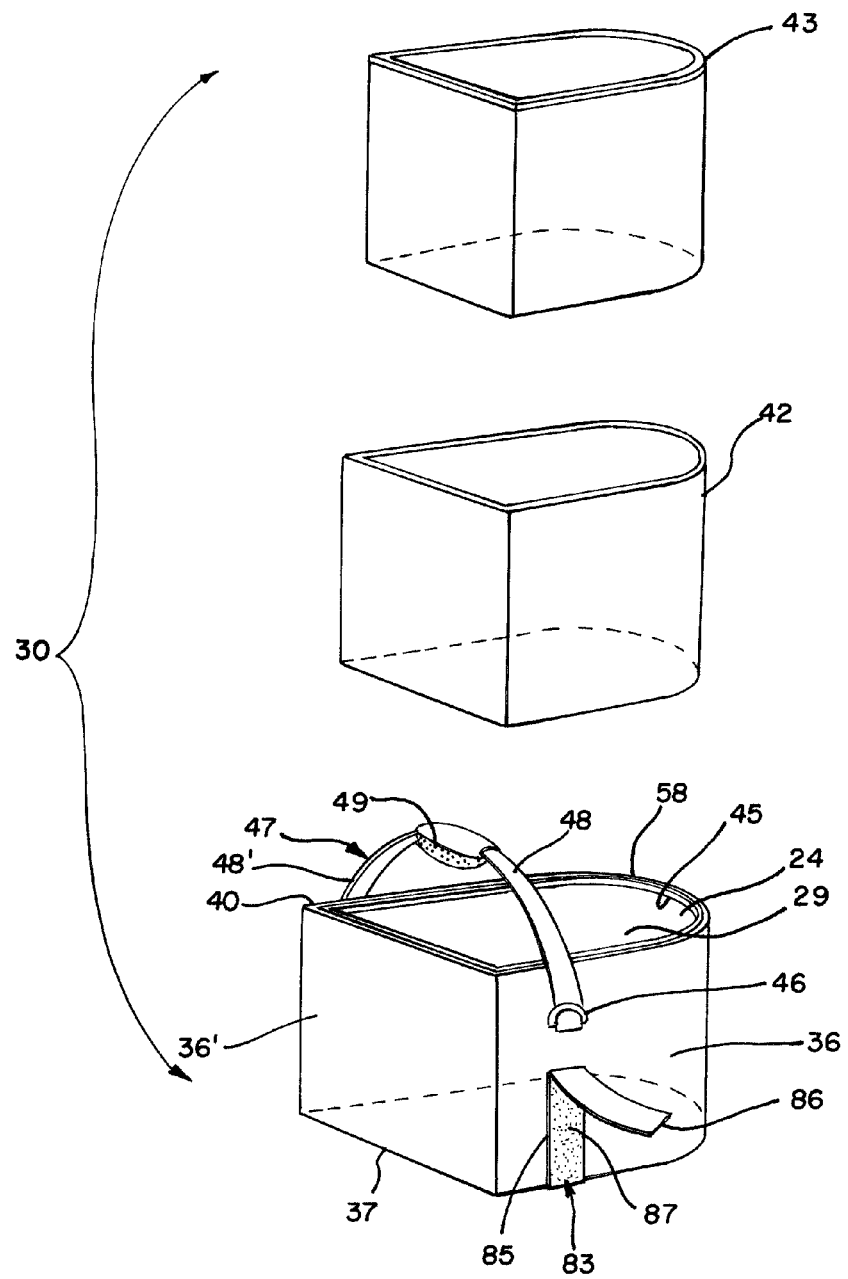

FIG. 4 is an exploded, top perspective view of a carrier device of the pet bed apparatus of FIG. 1.

Figure 5:
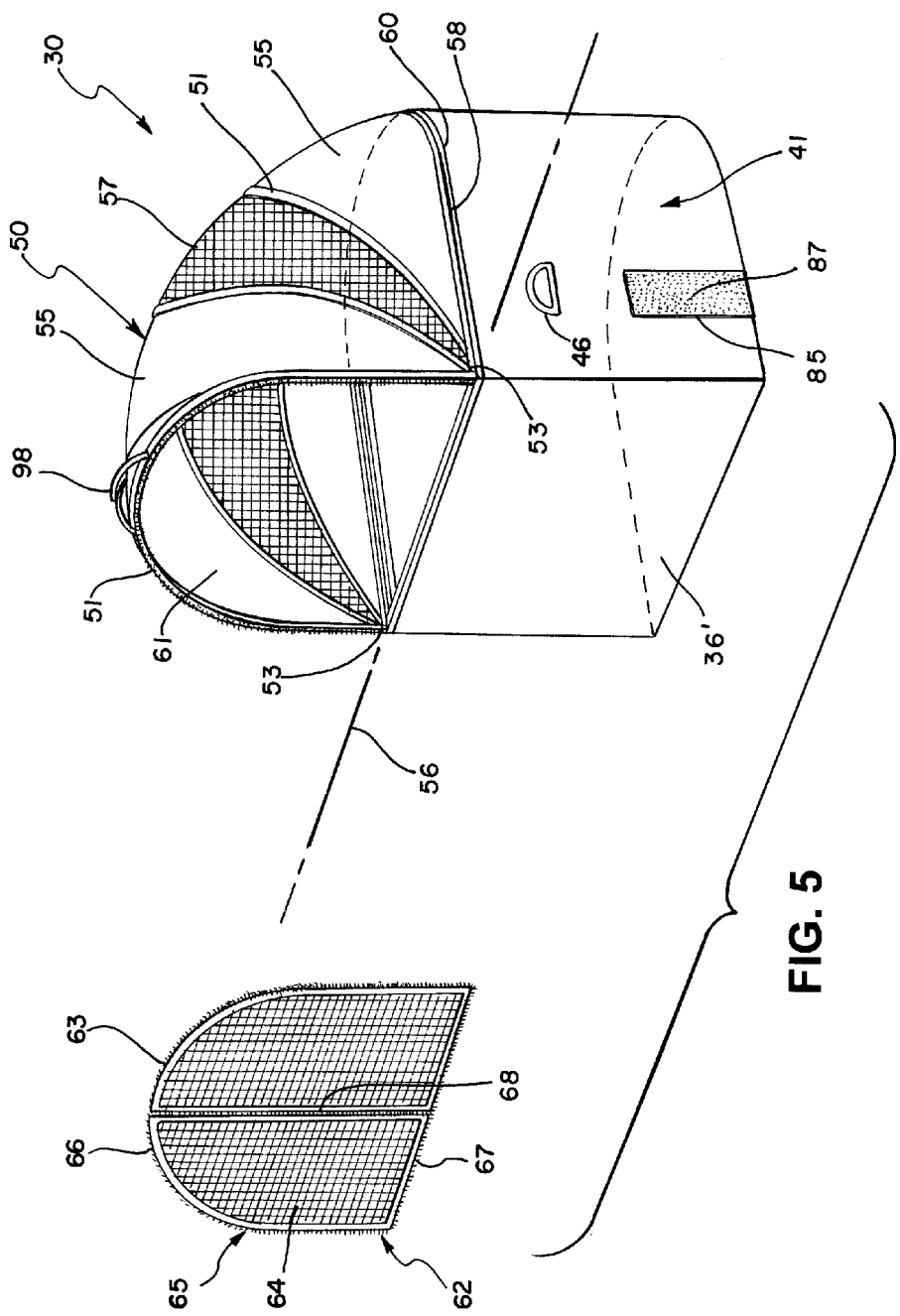

FIG. 5 IS a top perspective view of the carrier device of FIG. 4, incorporating a hood.

Figure 6:
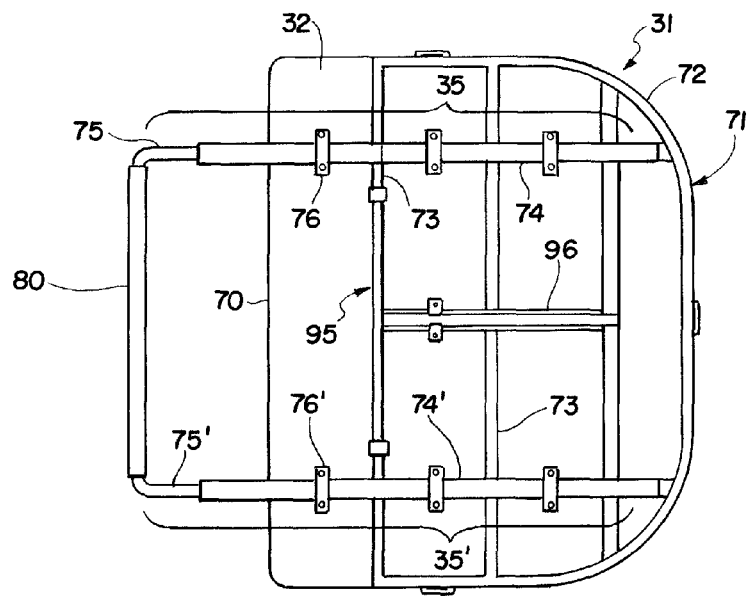

FIG. 6 is a bottom plan view of a mounting assembly for a large size pet bed apparatus of FIG. 1, illustrated in a stowed position.

Figure 7:
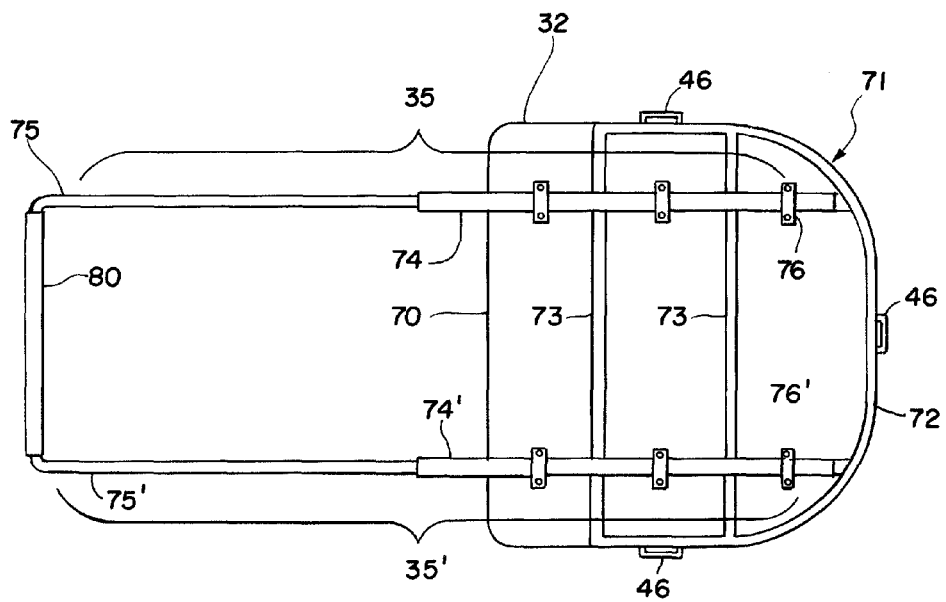

FIG. 7 is a bottom plan view of a mounting assembly for a medium size pet bed apparatus of FIG. 1, illustrated in a deployed position.

Figure 8:
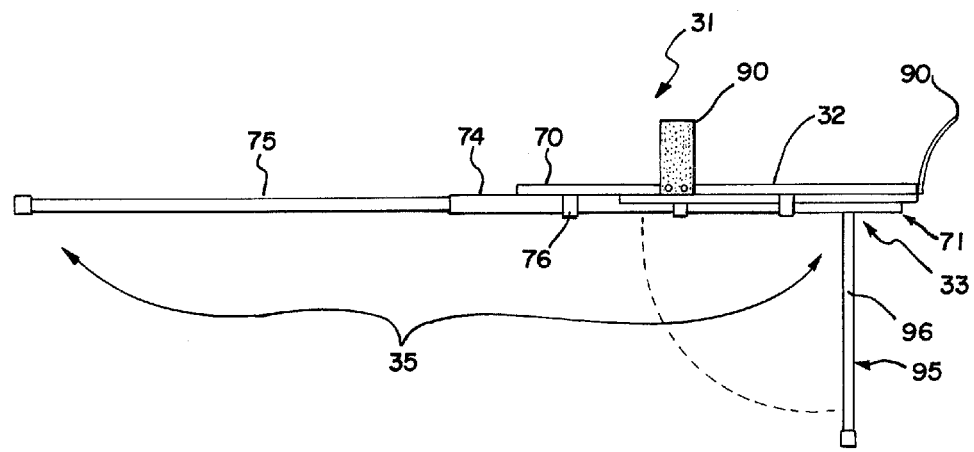

FIG. 8 is a side elevation view of the mounting assembly of FIG. 6, shown in the deployed position, and in a support position.

Figure 9:
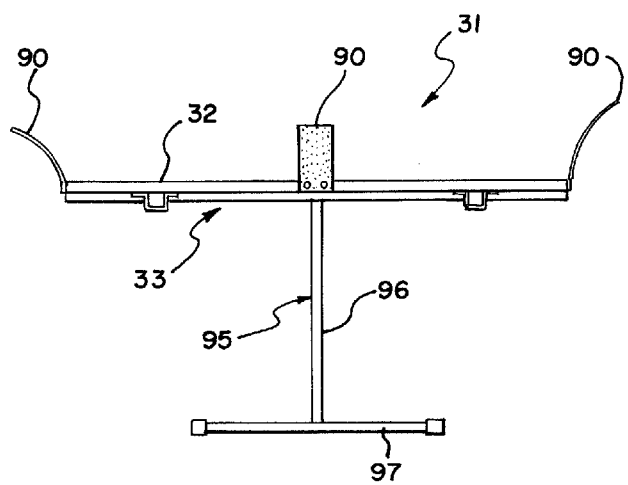

FIG. 9 is a rear elevation view of the mounting assembly of FIG. 6, shown in the support position.

Figure 10:
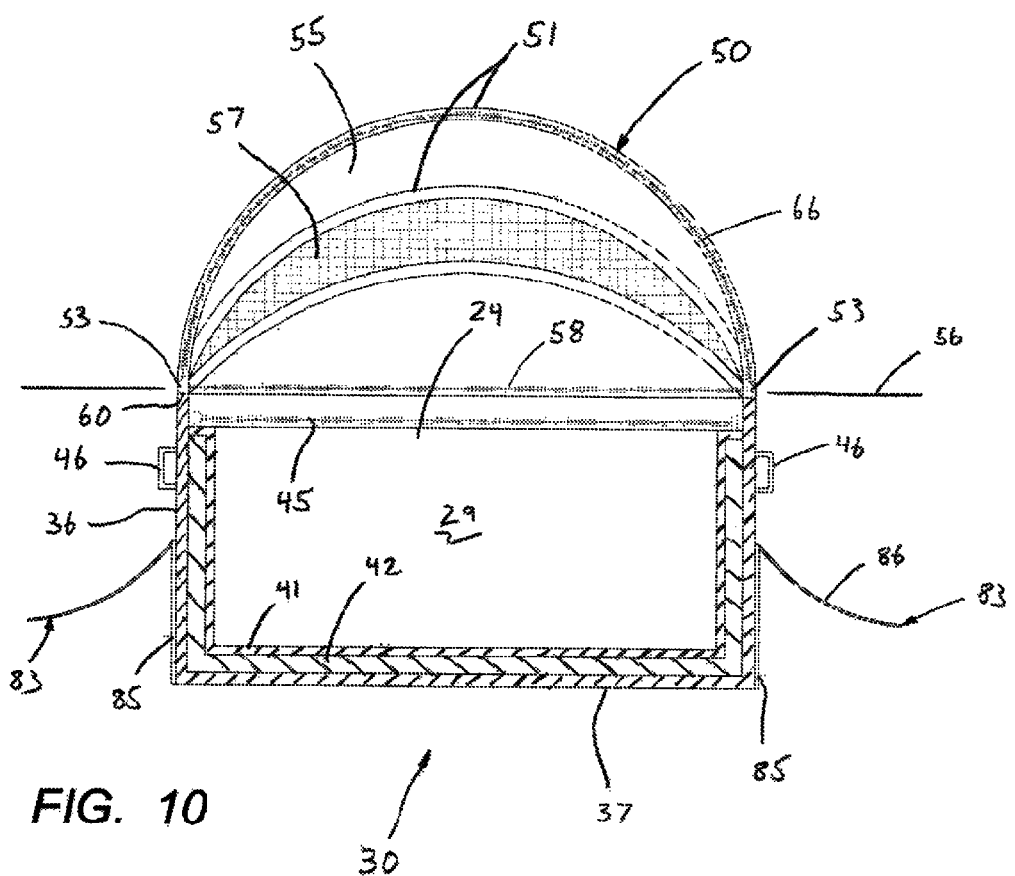

FIG. 10 is an enlarged, front elevation view, partially in cross-section, of carrier device of FIG. 5.

Figure 11:
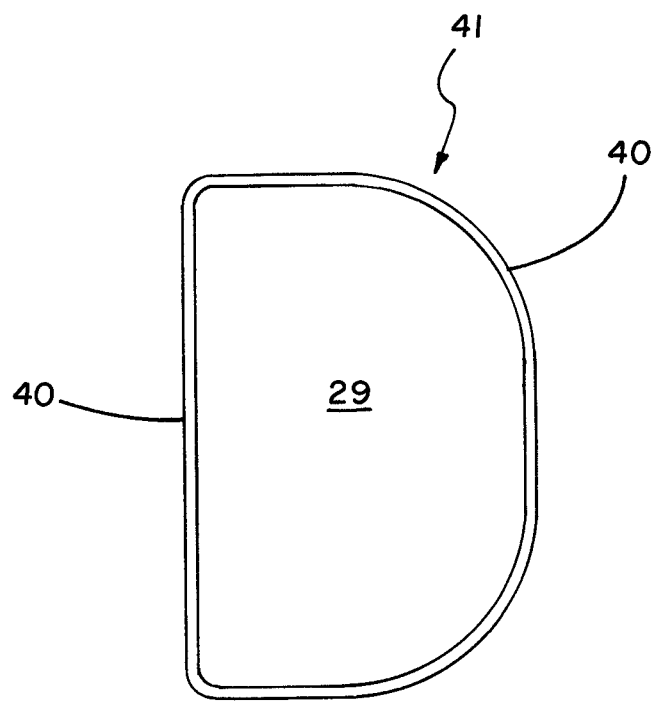

FIG. 11 is a top plan view of an outer shell for a medium size carrier device of FIG. 4.

Figure 12:
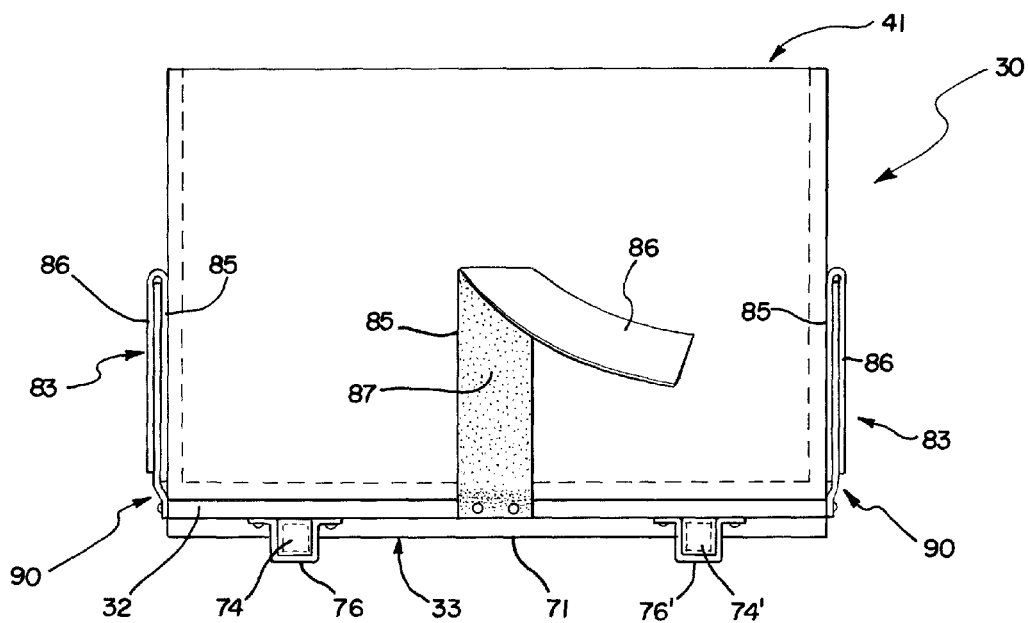

FIG. 12 is an enlarged, rear elevation view of the pet bed apparatus of FIG. 1, illustrating one embodiment of the latching mechanism.

Figure 13:
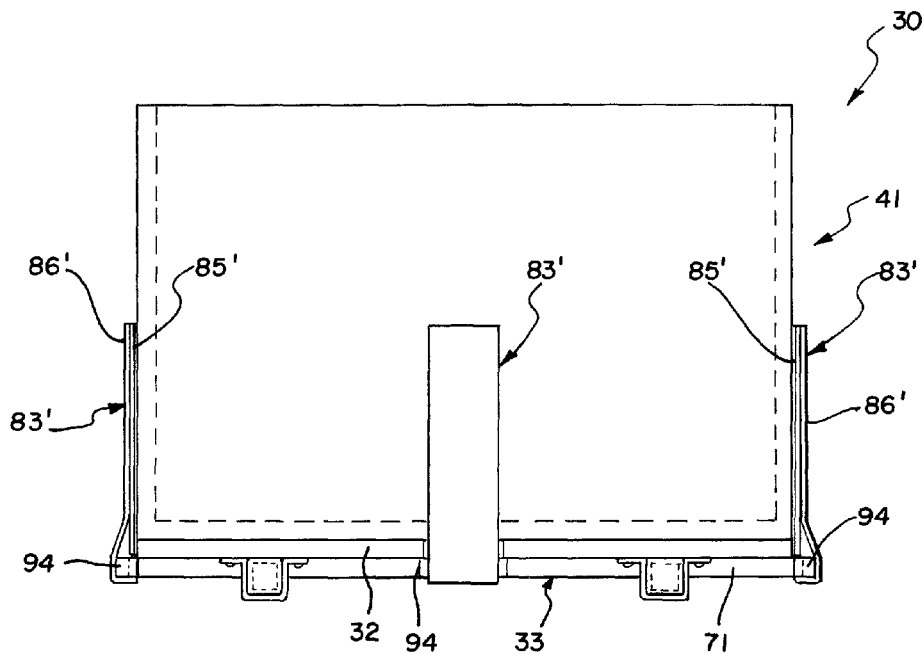

FIG. 13 is an enlarged, rear elevation view of the pet bed apparatus of FIG. 1, illustrating another embodiment of the latching mechanism.

Figure 14:
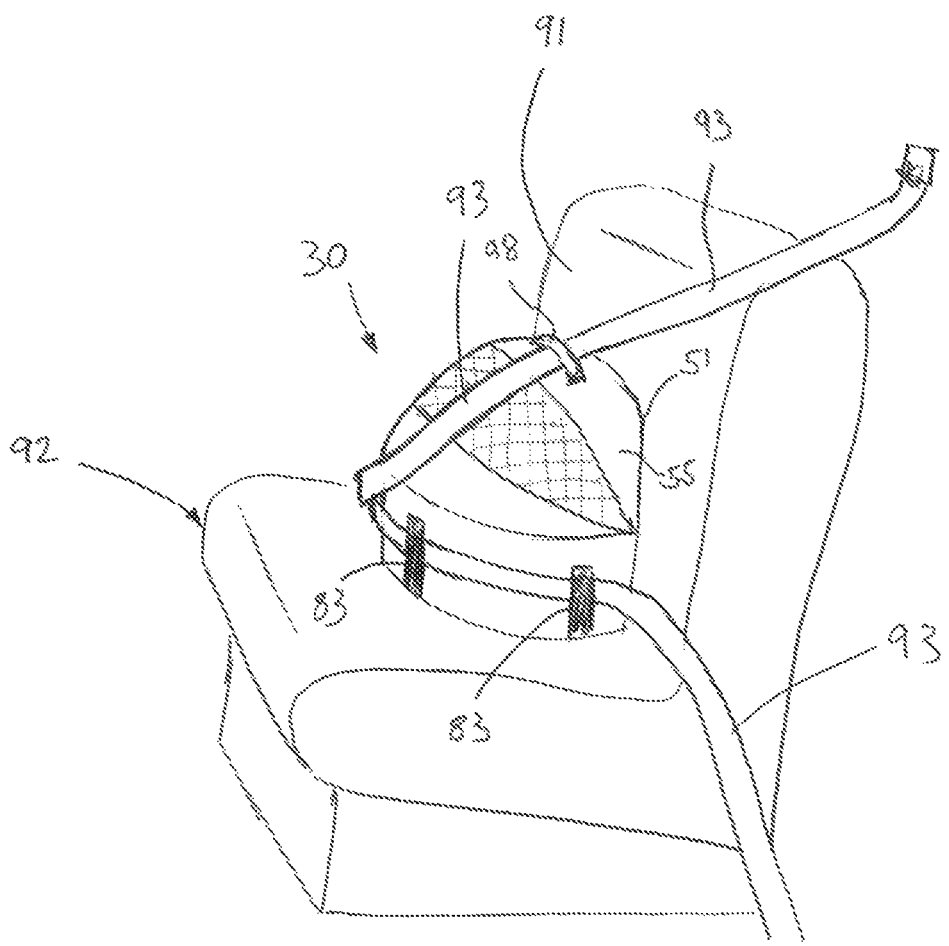

FIG. 14 is a top perspective view of the carrier device of FIG. 4, shown mounted to an automobile seat.

Figure 15:
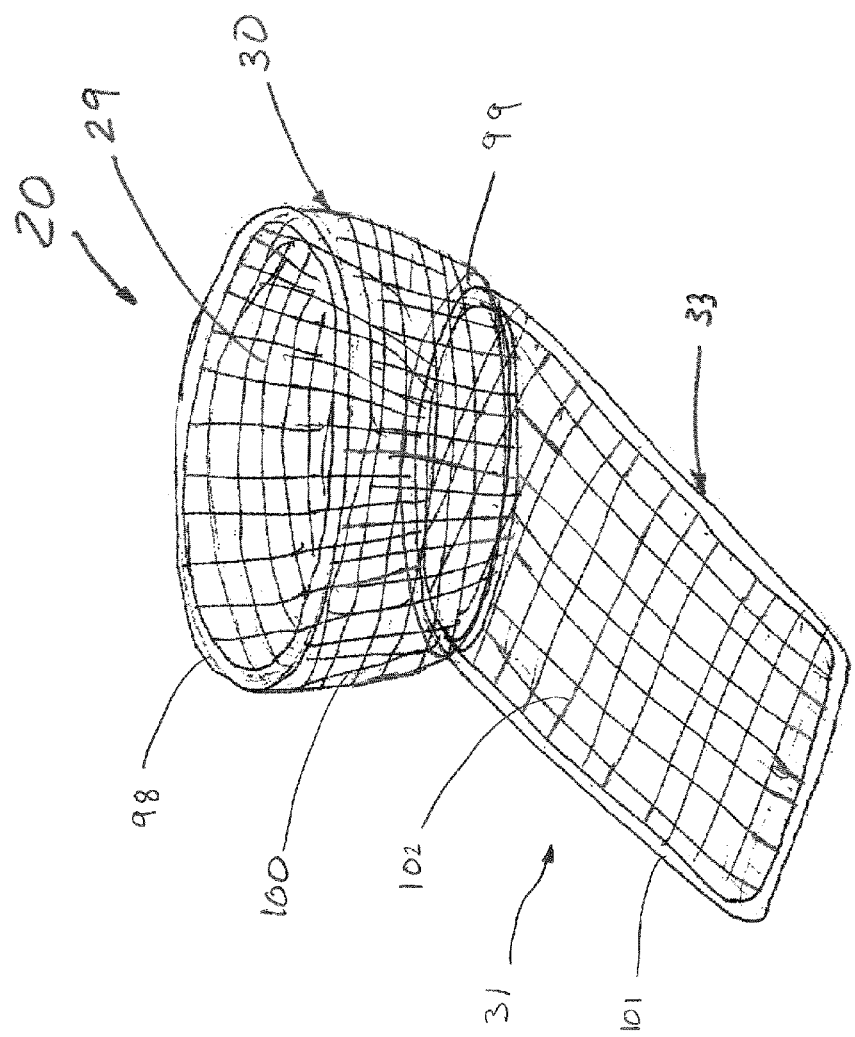

FIG. 15 IS a top perspective view of an alternative embodiment pet bed apparatus.

Figure 16:
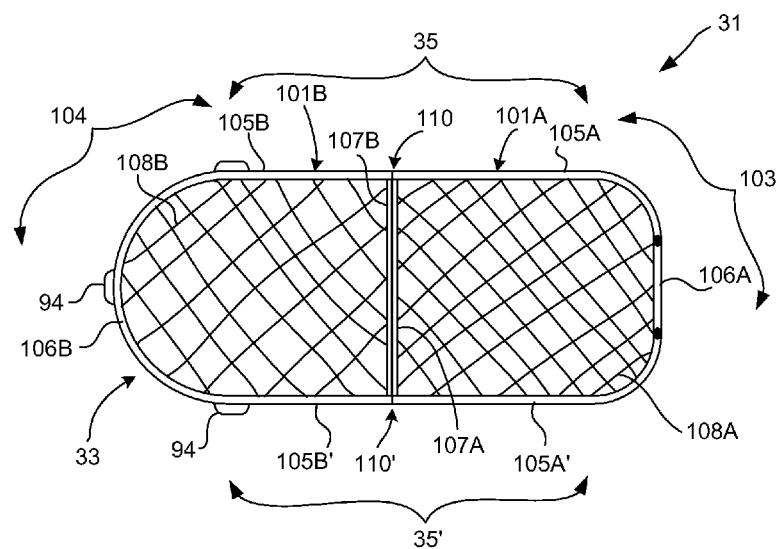

FIG. 16 is a top plan view of an alternative embodiment 2-piece mounting assembly of the pet bed apparatus of FIG. 15, shown in the deployed position.

Figure 17:
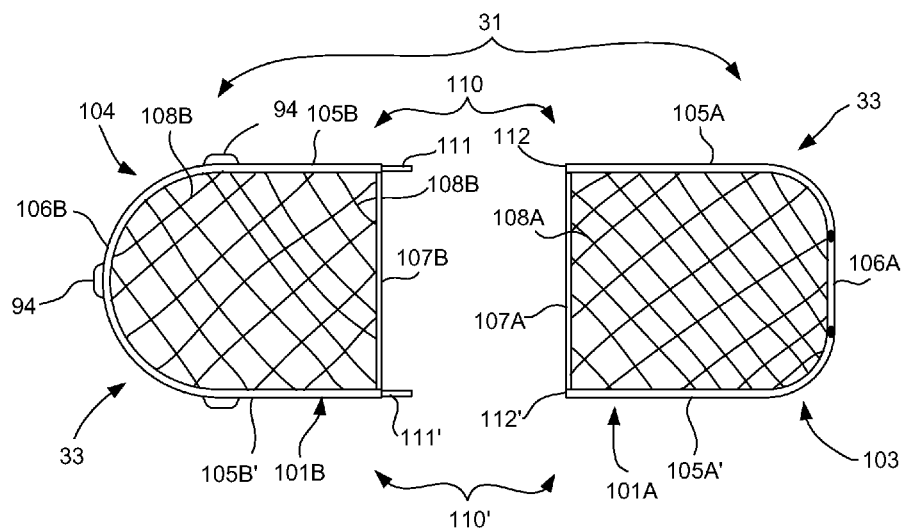

FIG. 17 is a top plan view of the alternative embodiment 2-piece mounting assembly of the pet bed apparatus of FIG. 15, shown in a detached position.

FIG. 18 is a side elevation view of the pet bed apparatus employing the 2-piece mounting assembly of FIG. 16.

Figure 21:
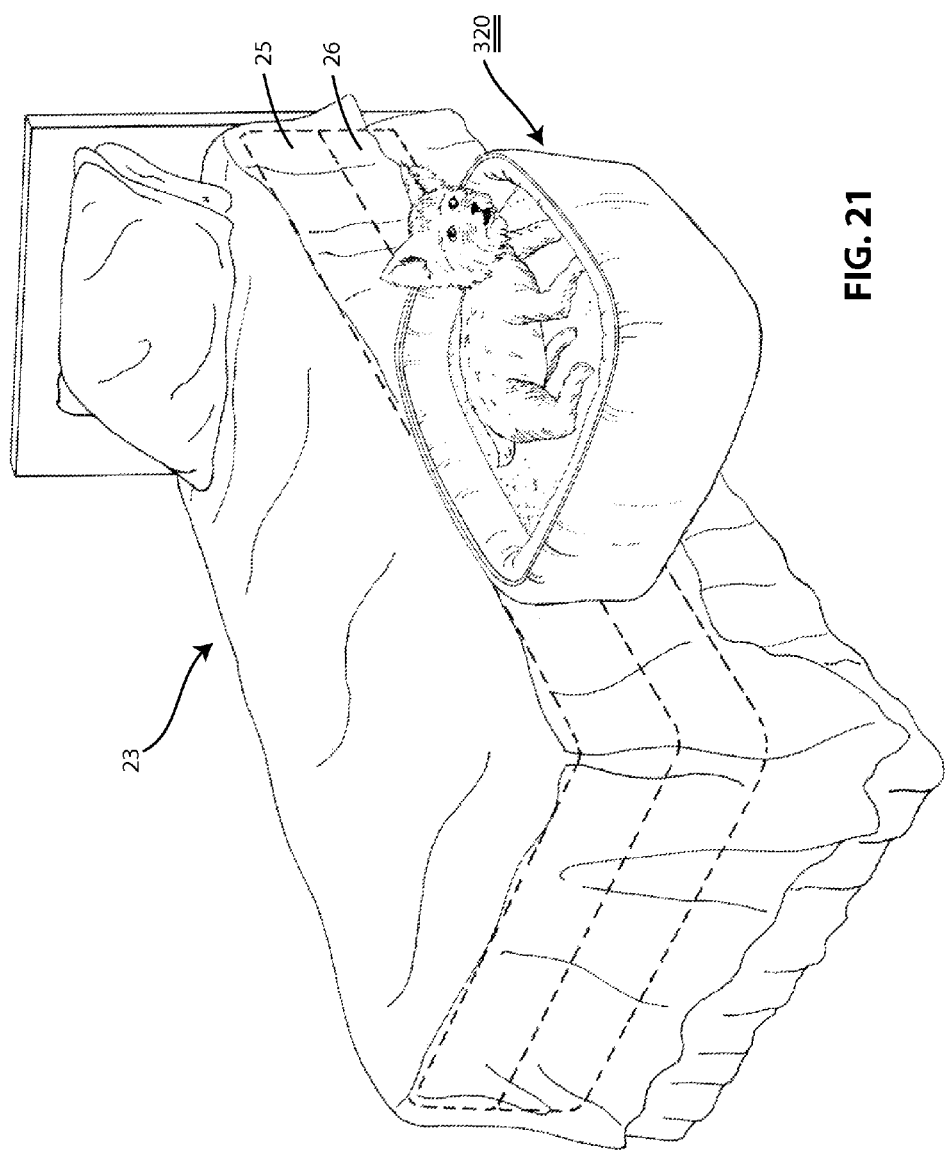
Figure 22:
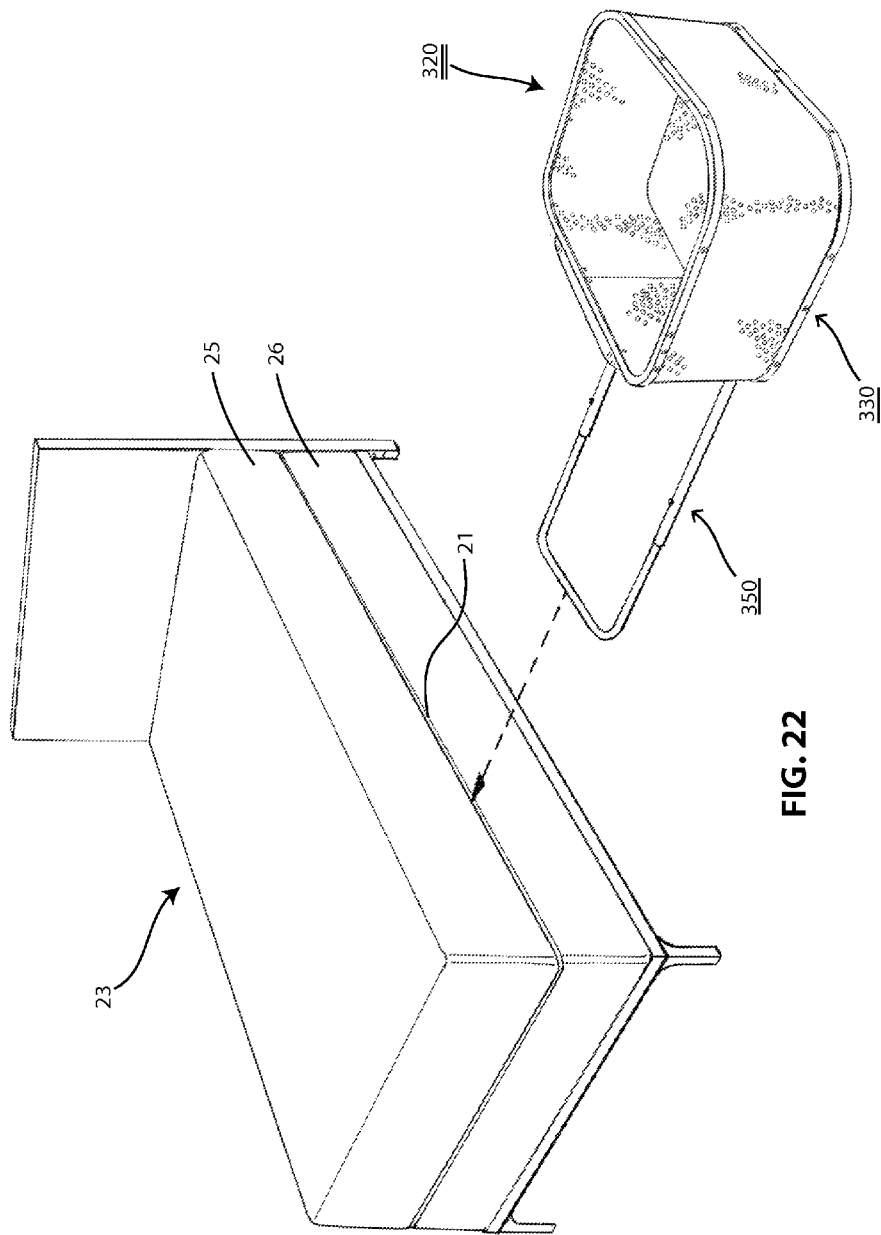

FIG. 19 is a schematic cross-sectional view of a pet bed apparatus 320 constructed in accordance with a third preferred embodiment of the present invention that includes a carrier device 330 and a mounting assembly 350 having a vertical portion 352. The carrier device 300 is connected to the mounting assembly 350 via a suitable connector assembly 380. The benefit of this embodiment is that the mounting assembly 350 is substantially flush with the side of the bed when the carrier device 330 is removed;

FIG. 20 is an exploded schematic view of the pet bed apparatus of 320 of FIG. 19 showing how the connector assembly 380 is generally formed from two interoperating portions 381, 382 of any suitable configuration;

FIG. 21 is a perspective view of a pet bed apparatus 320 mounted between the mattresses of a bed in an inserted position;

FIG. 22 is a perspective view of the pet bed apparatus 320 of FIG. 21 (with the bedding removed for clarity) showing how it is slid into the inserted position;

4

Figure 23:
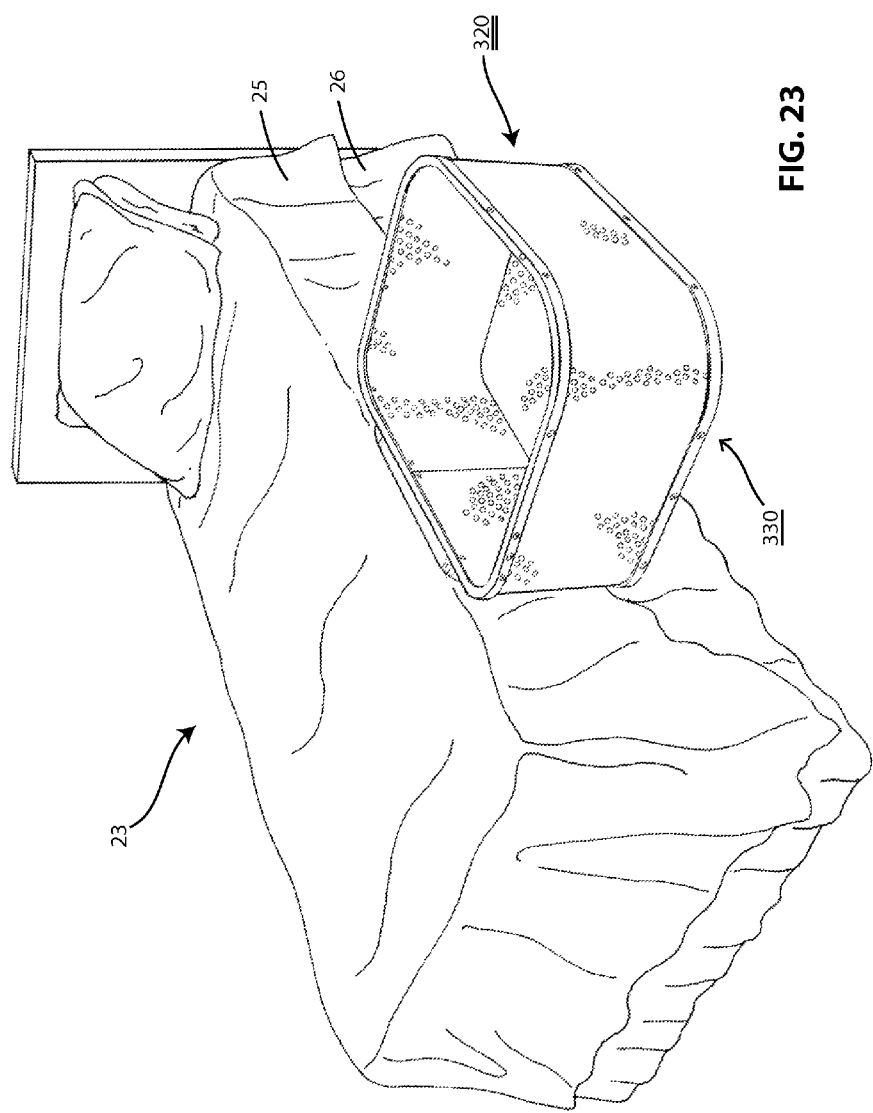
Figure 24A:
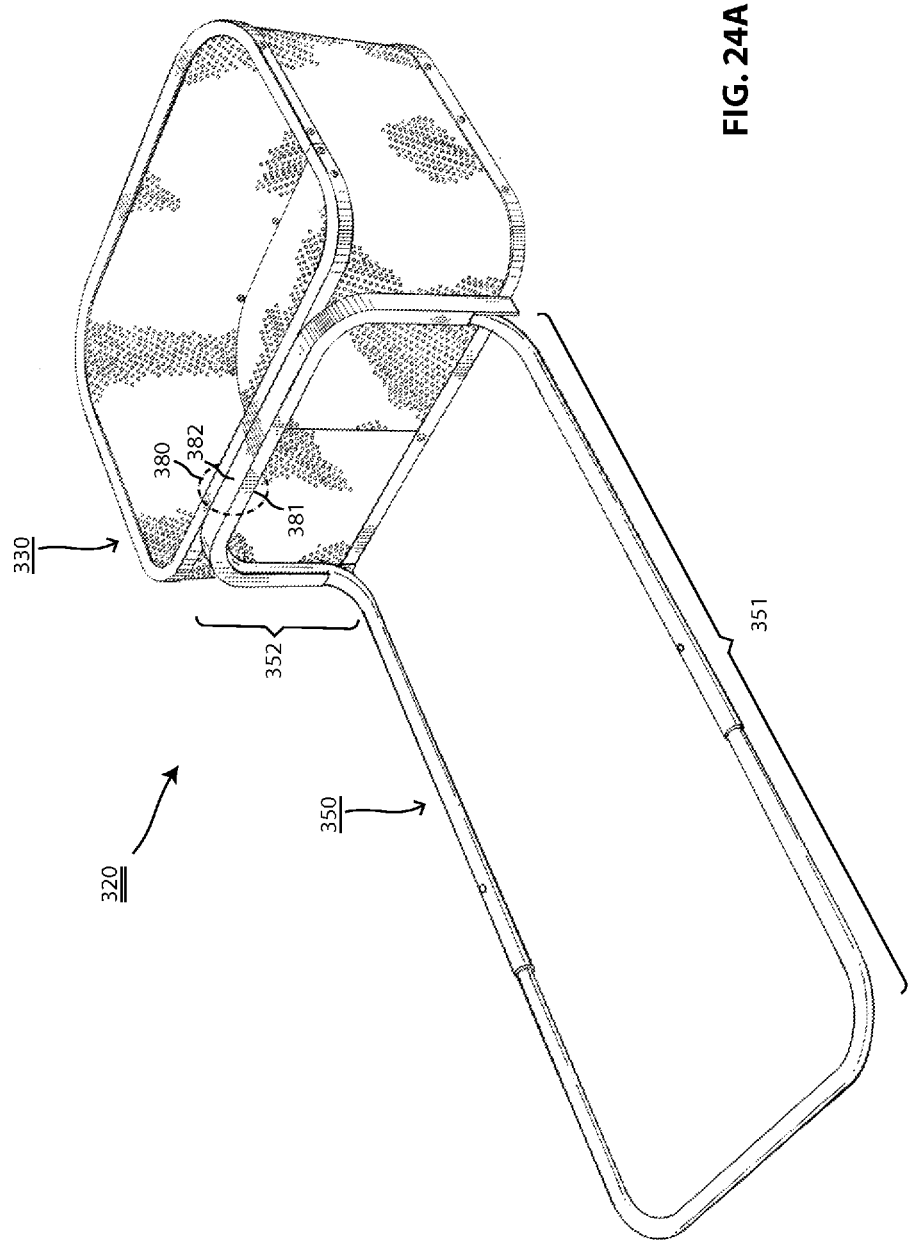
Figure 24B:
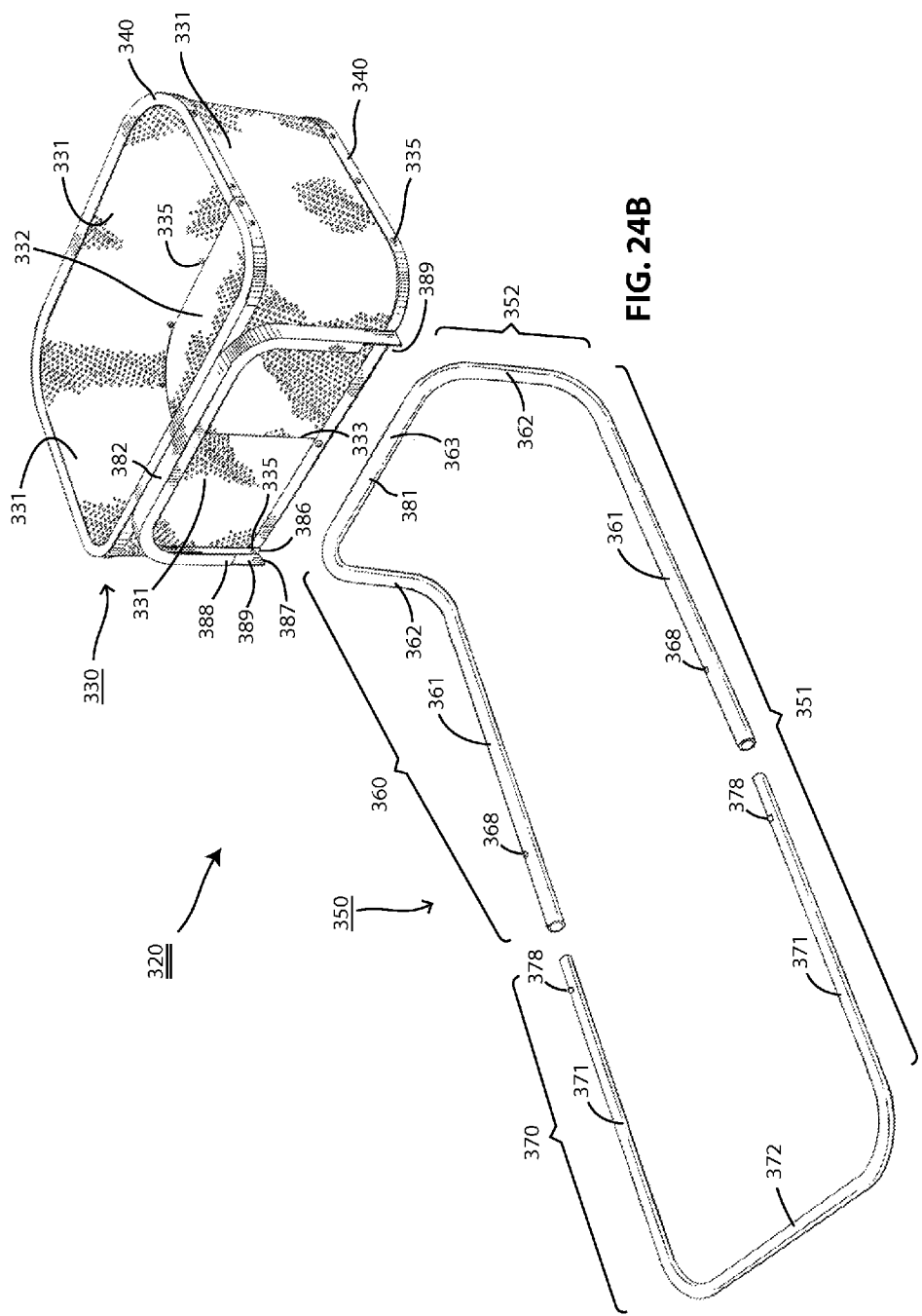
Figure 26:
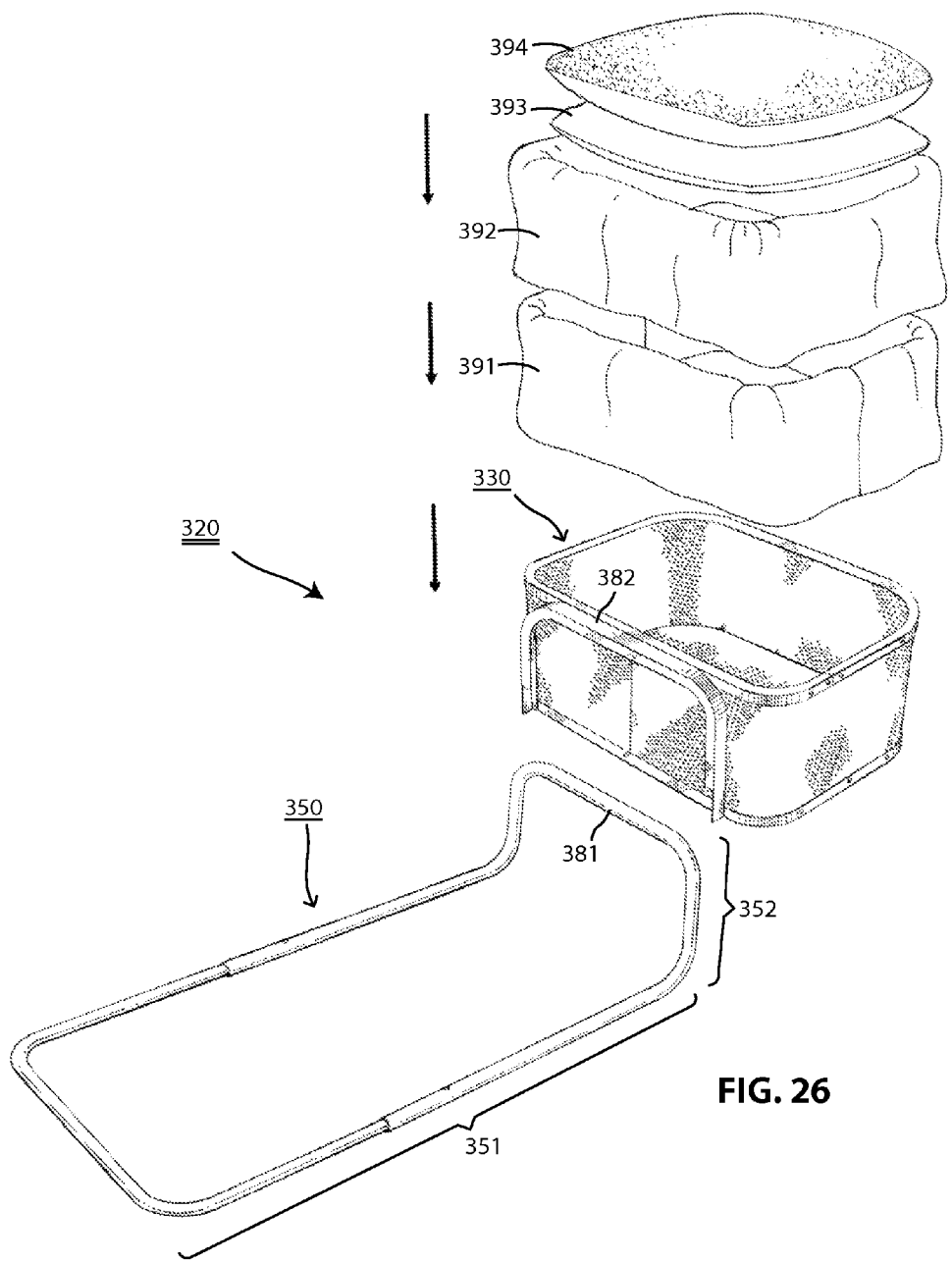
Figure 27:
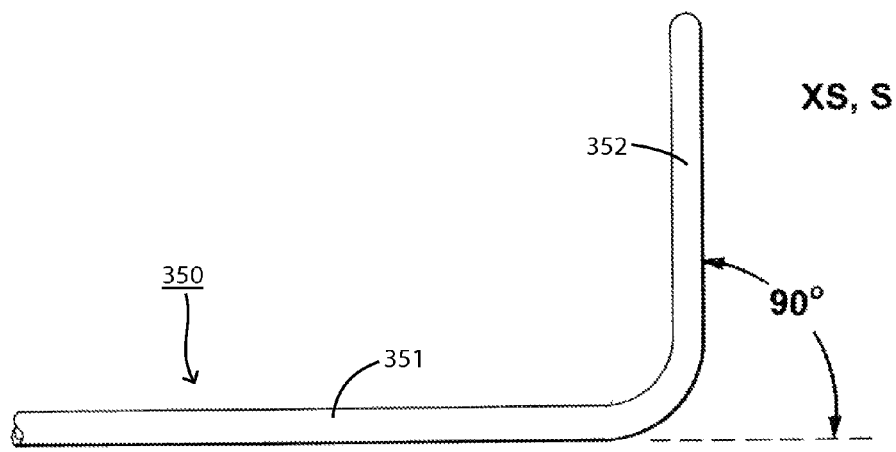
Figure 28:
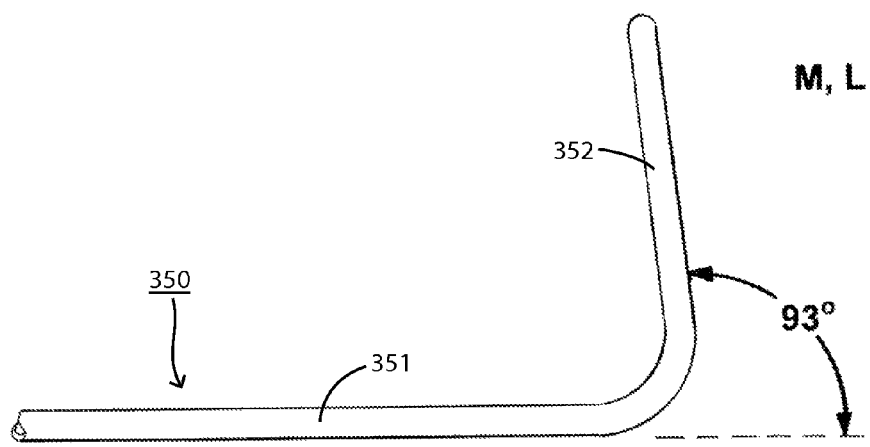
Figure 29B:
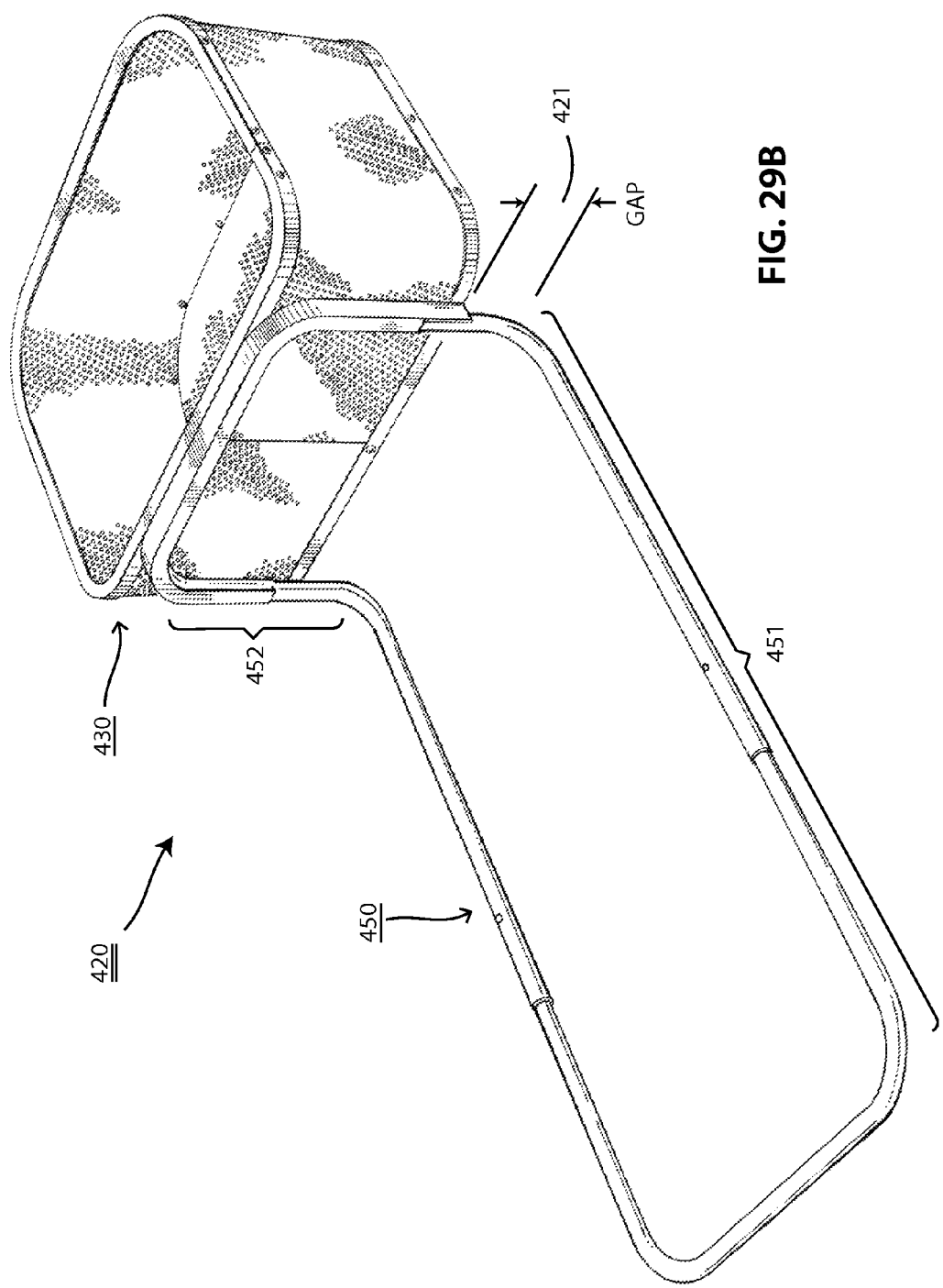

FIG. 23 is a perspective view of the pet bed apparatus 320 of FIG. 21 (with the bedding removed for clarity) showing it mounted between the mattress and box spring of the bed in the inserted position;

FIGS. 24A and 24B are normal and exploded perspective views of the pet bed apparatus 320 of FIG. 21 as viewed from a bed-facing side thereof, showing how the carrier device 330 interfaces with the mounting assembly 350 via a connector assembly 380 formed from a tubular end portion 381 of the mounting assembly 350 and a corresponding channel portion 382 on the side of the carrier device 330;

FIGS. 25A and 25B are exploded perspective views showing how the preferred pet bed apparatus 320 further includes a cover 390 that visually and physically conceals the hole on the vertical portion 352 of the mounting assembly;

FIG. 26 is an exploded view of the pet bed apparatus 320 showing how the preferred bedding components 391 to 394 are attached to the carrier device 330;

FIG. 27 is a side view of the mounting assembly 350 used in a pet bed apparatus 320 designed for a medium (M) or large (L) carrier device, the vertical portion 352 extending from the horizontal portion 351 at about a 93 degree angle to account for the additional weight of the larger carrier device and occupying pet;

FIG. 28 is a side view of the mounting assembly 350 used in a pet bed apparatus 320 designed for an extra small (XS) or small (S) carrier device, the vertical portion 352 extending from the horizontal portion 351 at about a 90 degree angle;

FIGS. 29A and 29B are exploded and normal perspective views, respectively, showing a further preferred pet bed apparatus 420 where the height of the mounting assembly 450 exceeds the height of the carrier device 430 to create a gap 421;

FIGS. 30 and 31 illustrate the relative heights of the mounting assembly 450 and of the carrier device 430;

FIG. 32 shows how a 3" gap 421 is formed when the carrier device 430 is connected to the mounting assembly 450;

FIG. 33 shows the pet bed apparatus 420 mounted to a conventional bed 23 having a mattress 25 supported atop a box spring 26 and a steel bed frame 27; and FIG. 34 shows the same pet bed apparatus 420 mounted to platform bed 23' having a mattress 25 supported by a platform 27', the gap 421 permitting such installation.

DETAILED DESCRIPTION OF THE PREFERRED EMBODIMENTS

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

1. First Preferred Pet Bed Apparatus

A first preferred pet bed apparatus is shown in FIGS. 1-14.

1.1 Generally

Turning now to FIGS. 1-5, a pet bed apparatus, generally designated 20, is provided that can be cantilever mounted in an interface 21 formed in a side wall 22 of a structure 23. In one particular embodiment, for example, the structure 23 is provided by a conventional bed assembly having an upper mattress 25 supported atop a mattress support 26, forming the interface 21 between a bottom surface 27 of the upper mattress 25 and an upper surface 28 of the mattress support 26.

The cantilever mounted pet bed apparatus 20 includes a carrier device 30 having a rugged outer shell 41 that defines an upper opening 24 extending into a bedding space 29 of the carrier device that is sized and dimensioned to accommodate a domestic pet therein. Briefly, by adding a covered hood 50 (FIGS. 5 and 10) over the outer shell upper opening 24, as will be described in greater detail below, the carrier device 30 may function as a conventional pet carrier for transport thereof.

1.2. Mounting Assembly

Referring now to FIGS. 2 and 6-9, the pet bed apparatus 20 further includes a mounting assembly 31, removably mounted to the carrier device 30 that cooperates with the structure interface 21 for selective cantilever mounting thereto. The mounting assembly 31 includes a support platform 32 configured to vertically support a bottom wall 37 of the carrier device 30 thereatop, and a frame assembly 33 supporting the support platform 32.

The frame assembly 33, it will be appreciated, not only functions to vertically support the support platform 32, but functions to enable cantilever supportive mounting thereof to the structure side wall 22. To perform the latter function, the frame assembly includes a movable mounting leg 35 configured for selective manual manipulation between a stowed position (FIGS. 2 and 6) and a deployed position (FIGS. 1, 7 and 8). In the stowed position, the mounting leg 35 of the frame assembly 33 is in a retracted orientation, reducing the overall footprint of the pet bed apparatus 20 to facilitate transport and storage thereof. In the deployed position, the mounting leg 35 is extended distally outwardly (e.g., from an abutting side wall 36' of the carrier device 30) by an amount sufficient to enable selective friction-fit insertion of at least a portion of the frame assembly 33 to an inserted position. In this fully inserted position, as shown in FIG. 1, the pet bed apparatus 20, via the mounting leg 35, is cantilever supported against the side wall 22 of the bed assembly 23.

1.3 Conversion from Pet Carrier to Pet Bed Apparatus

Accordingly, a portable carrier device 30 is provided that is capable of simplistic conversion from a pet carrier to a side mounted pet bed apparatus 20. By manipulating the mounting leg 35 of the mounting assembly to the deployed position, the mounting leg can be inserted into the structure interface 21 (e.g., between the upper mattress 25 and the lower mattress support 26) toward the inserted position (FIG. 1). Consequently, the pet bed can be positioned directly adjacent to, as well as at a similar height as, the upper mattress of the bed assembly. The pet carrier device and portable pet bed apparatus of the present invention, thus, enable one's pet to nearly share a sleeping arrangement with their owner without having their pet directly occupy the owner's same bed assembly.

Referring back to FIGS. 4 and 5, the carrier device 30 may function as a conventional pet bed, especially when additional bedding (not shown) is added to, or disposed in, the bedding space 29. The bedding space 29, therefore, is not only sized and dimensioned to accommodate the pet in a resting position, but also may accommodate a pet mattress or additional bedding to enhance bedding comfort.

The outer shell 41 of the carrier device preferably includes the bottom wall 37 and the plurality of side walls 36 upstanding from a peripheral edge of the bottom wall. The collective upper peripheral edges 40 of the side walls 36, therefore, define the opening 24 into the carrier device bedding space 29. The abutting side wall 36' of the plurality of peripheral side walls 36, in particular, is size, shaped and oriented to enable substantially flush seating against the side wall 22 of the structure (e.g., the bed assembly 23), in the inserted condition (FIG. 1). This, of course, enables the carrier device 30 to be placed substantially adjacent to the bed assembly, positioning the bedding space 29 at or near the same height as the upper surface of the upper mattress.

The orientation of the abutting side wall 36' is also suitably sized and shaped for positioning substantially flush against a back rest portion 91 of an automobile seat 92 (FIG. 14). As will be detailed below, the present inventive pet bed apparatus therefore also functions as a pet carrier device that can be secured in the seating of an automobile using the conventional automobile seat belting thereof.

1.4 Shape and Size of First Preferred Carrier/Pet Bed Apparatus

With respect to the outer shape of the remaining peripheral side walls 36, it will be appreciated that they can be virtually any shape. Preferably, as shown in FIG. 11, the remaining peripheral side walls are collectively rectangular or D-shaped, for a pleasing aesthetic appearance. Moreover, the carrier device may be provided with varying sizes, heights, widths, etc. to accommodate various size pets, such as cats, and especially the differing size of dogs, depending upon the breed. Typically, however, the carrier device may be provided in a small, medium and large size to accommodate most typical domestic pets. For instance, the small size carrier device may have height, width and depth dimension in the range of about 12" H×18" W×14" D (e.g., to accommodate pets weighing in the range of about 1 lb to about 12 lbs), while the medium size carrier device may have height, width and depth dimension in the range of about 12" H×22" W×16" D (e.g., to accommodate pets weighing in the range of about 1 lb to about 20 lbs). With respect to the large size carrier device, the height, width and depth dimension are preferably in the range of about 12" H×30" W×18" D (e.g., to accommodate pets weighing in the range of about 1 lb to about 40 lbs). Such dimensions and weight ranges, however, may vary of course.

1.5 Nested Construction of First Preferred Carrier/Pet Bed Apparatus

The carrier device 30 itself may be provided by a single unitary structure, or be a multiple piece construction. Preferably, as shown in the exploded view of FIG. 4, the carrier device 30 is comprised of the rugged outer shell 41, a padded insert 42 and comfortable inner liner material, all configured to seat in a nested orientation. Accordingly, it will be appreciated that the shape, dimension and size of each subsequent inner component thereof is substantially similar to, albeit slightly smaller than, the outer shell 41.

With respect to the design properties of the outer shell 41, a lightweight, yet strong, rigid or semi-rigid design is most desirable that is also cost effective to manufacture. Such outer shell constructions may include lightweight fabrics or synthetic polymer materials, such as nylon, that are interiorly reinforced with paper, cardboard, plastic, foam, rubber and/or wood material inserts, similar to that of luggage grade constructions. Other lightweight materials include natural materials and weaves, composites and/or combinations thereof.

The padded insert 42 is preferably provided by a conventional lightweight, flexible material, such as a poly-fill material. Such a poly-fill insert 42 adds stout interior padding for the pet occupant, is washable and can be easily removed from the outer shell 41, yet be secured therein. The padding thickness can vary, but is preferably in the range of about ¾" to about 2" thick. In another pillow-shaped pad, the thickness may be on the order of ¾" on the sides and 3"-6" in the middle.

Depending in-part upon the friction fit cooperation between the padded insert within the bedding space 29 of outer shell 41, the insert may just be seated inside without any fasteners or adhesive. In other instances, the padded insert 42 may be removably coupled within the shell through fasteners, snap buttons and/or VELCRO®, or the like.

The inner liner 43 is also provided by a comfortable, washable material, sized and dimensioned to be placed over and adjacent to the interiorly facing surface of the padded insert 42. Such liner material may be provided a synthetic fur material or other soft material, for example, to promote comfort.

The padded insert 42 is preferably enclosed within and between the interior (i.e., the bedding space 29) of the outer shell 41 and the inner liner 43. This arrangement facilitates positioning of the padded insert 42 with the outer shell, as well as facilitating cleanliness. To enclose the padded insert 42 within the bedding space 29 of the outer shell 41, the upper peripheral edge of the inner liner 43 is mounted at or proximate to the collective upper peripheral edges 40 of the upstanding side walls 36 of the outer shell. Preferably, a fastening device 45, such as a zipper or the like, is located about ½" to about 2" below the shell upper peripheral edges 40. By applying this fastener device 45 between the liner 43 and the outer shell 41, the inner liner 43 can easily be removably coupled thereto.

1.6 Shoulder Straps

As mentioned above, the carrier device 30 can be used as a separate pet transportation unit as well. Thus, as shown in FIG. 4, to accommodate a shoulder strap or handle 47 to facilitate lifting of the carrier, two D-Rings 46 are mounted on opposed side walls 36 of the carrier device 30. Applying conventional strap and latch buckle hardware, the shoulder strap and/or handle 47 can removably mounted to the D-Rings 46.

In one specific configuration, the shoulder strap or handle 47 can be provided by a convention one or two piece construction. In the two piece design, for instance, as best illustrated in FIG. 4, each respective strap piece 48, 48' is independently mounted to a corresponding D-Ring 46 on one end, and removably fastened to one another on the opposed ends, for example, a VELCRO® fastener 49.

1.7 Collapsible Hood

For covered transport of the carrier device 30, a collapsible cover device or hood 50 can be removably installed over the opening 24 into the bedding space 29 of the outer shell 41. In this manner, the pet bed apparatus 20 can be converted into a completely covered carrier device for enclosed transport of the pet. This design, of course, is beneficial to prevent escape of the pet occupant, as well as keeping them dry during inclement weather. Furthermore, this containment also functions to hold the pet occupant until they become more comfortable and accustomed to the bed itself.

As best illustrated in FIGS. 5 and 10, the collapsible hood 50 is designed to upstand from the upper peripheral edges 40 of the outer shell side walls 36, as opposed to merely extending horizontally over the opening 24. The collapsible hood 50, thus, provides ample head space for the pet occupant to sit or stand-up.

In accordance with the present invention, the hood 50 is capable of collapsing, reducing its overall footprint. For instance, the collapsible hood 50 may be moved between an extended, covered condition (FIGS. 5 and 10) and a collapsed, folded condition (not shown), collapsing in an accordion-type fashion similar to a hood of a baby stroller. Similarly, as shown in FIG. 10, the hood 50 may include a plurality of U-shaped reinforcement ribs 51, each having opposed ends 52 pivotally mounted to pivot mounts 53 oriented at the opposed corners of the hood. These ribs 51 must be sufficiently flexible to bend into the arch or U-shape form of the material web portions 55 between adjacent ribs 51, yet be sufficiently rigid and resilient to tautly deploy and retain this hooded form when inserted or sewn into receiving channels of the web portions 55.

In one specific configuration, at least three reinforcement ribs 51 are provided, pivotally spaced-apart about a rotational axis 56, forming the pivot mounts 53 for the reinforcement ribs during movement between the extended, covered condition (FIGS. 5 and 10) and a collapsed, folded condition (not shown). Material examples of such reinforcement ribs include plastics, fiberglass, nylon and wood for varying thicknesses and compositions.

These U-shaped ribs 51 may be substantially the same size, or may be slightly sequentially smaller. The latter arrangement enables a nested, folded relationship when moved to the collapsed, folded condition. This is beneficial in that, when the hood 50 is in the collapsed orientation, it may be seated more flush against the arched section of the upper peripheral edges 40 of the outer shell side walls 36. By comparison, reinforcement ribs that are substantially the same diameter would tend to stack up upon one another, in the collapsed, folded condition.

As mentioned above, the flexible crescent-shaped web portions 55 extend between the adjacent reinforcement ribs 51, forming a closure therebetween for the hood 50. Preferably, each web portion 55 is composed of a flexible nylon material that provides sufficient strength, yet semi-breathability for the pet occupant. To further promote breathability, however, a central web portion 57 of the hood 50 is composed of a nylon mesh or rubber coated nylon mesh material, offering greater porosity, and thus greater breathability.

To removably mount the hood 50 to the outer shell 41, the lower peripheral edge portion 60 of the hood is affixed to the opposed upper facing peripheral edges 40 of the outer shell through a fastener device 58. This edge to opposed edge affixation facilitates mounting ease therebetween, as well as provides easier visual assurance that such affixation is maintained, and thus, not compromised. In one specific embodiment, the fastened device 58 is also provided by a zipper mechanism or the like. It will be appreciated that the fastener device can be provided by any removable fastener, such as by a plurality of button-type fasteners. In such an arrangement, however, the space must be sufficiently close so as not to permit the pet occupant to escape therebetween.

In one specific configuration, as shown in FIG. 5, a front portion of the collapsible hood 50 includes a D-shaped hood opening 61, thus providing access to the outer shell bedding space 29, even when the collapsible hood 50 is mounted to the outer shell 41. This is true whether the hood 50 is oriented in the unfolded condition or the folded, collapsed condition. In such a configuration, therefore, to fully enclose the opening 24, a substantially flat, D-shaped closure screen 62 is required that is sized and dimensioned to snugly fit within the D-shaped hood opening 61. This screen includes a D-shaped outer frame 63 that provides strength and rigidity similar to that of reinforcement ribs 51. A nylon, breathable mesh material 64 extends between the D-shaped outer frame 63, thus forming the closure screen. This mesh material 64 is the same or substantially the same as that deployed in the crescent-shaped central web portion 57. Examples of such materials include nylon or rubber coated nylon material.

In a mounting manner similar to that between the collapsible hood 50 and the outer shell, a zipper-type closure screen fastener 65 or the like may line the outer periphery of the closure screen 62. However, since the U-shaped portion of the D-shaped opening 61 is formed by the front portion of the hood 50, while the bottom edge of the D-shaped opening is formed by one peripheral edge of the upstanding outer shell side wall 36, two independent zipper-type fasteners are employed. The closure screen fastener 65, thus, includes an upper first fastener portion 66, and an independent lower second portion 67. Accordingly, when both the upper first and lower second portions 66, 67 of the zipper-type closure screen fastener 65 are fully engaged, ingress and egress by the pet occupant, through the D-shaped opening 61, is fully prevented by closure screen.

In another specific embodiment, the closure screen 62 may include a central, vertical access zipper 68. When unzipped, thus, the ingress and egress may be accomplished therethrough without requiring removal or partial removal of the closure screen from the pet bed apparatus 20.

It will be appreciated that, collectively, the collapsible hood 50 and closure screen 62, similar to that of the outer shell 41, are sufficient stout and rugged to contain a properly sized domestic pet therein, without fear of escape therefrom. In one embodiment, the collapsible hood 50 and closure screen 62 are constructed from luggage grade reinforced framing and material webbing, as disclosed.

1.8 Conversion from Pet Carrier to Pet Bed Apparatus (see Section 1.3)

In accordance with the present invention, as mentioned above, one particularly beneficial aspect is the ability to convert the pet carrier device into a pet bed that can be side mounted to the structure 23, in a cantilever mounted manner. Preferably, the structure 23 upon which the carrier device 30 can be primarily mounted is a conventional bed assembly where the mounting legs 35, 35' are slid into the interface 21 between the mattresses.

1.9 Support Platform

Referring back to FIGS. 6 and 7, the mount is provided by the mounting assembly 31 which cantilever supports and secures the carrier device 30 to the bed assembly 23. Briefly, as already described previously, the mounting assembly 31 includes a support platform 32 configured to vertically support the bottom wall 37 of the carrier device 30 thereatop. The support platform 32 is preferably provided by a thin, plate-like support composed of a relatively rigid, yet lightweight material. Such suitable cost effective material would include plastic, wood, particle boards, heavy weight cardboards, etc., but also may include metallic materials as well. By way of example, the support platform 32 may be provided by ¼" thick plastic plate having a D-shaped peripheral footprint that substantially conforms to that of the bottom wall 37 of the carrier device 30.

1.10 Frame Assembly Plus Mounting Legs—Stowed or Deployed

The mounting assembly 31, as indicated, includes a frame assembly 33, coupled to the bottom of the support platform 32, that further includes one or more mounting legs 35 that can be manually manipulated for movement between the stowed position (FIGS. 2 and 6) and the deployed position (FIGS. 1, 7 and 8). In the stowed position, the frame assembly 33 is preferably in a retracted orientation reducing the longitudinal length of the frame assembly 33 and, thus, the overall footprint of the pet bed apparatus 20. This position facilitates transport and storage thereof. In the deployed position, the mounting leg or portions 35, 35' of the frame assembly 33 are extended outwardly from a lip portion 70 of the support platform 32. This extension is by an amount sufficient to enable selective friction-fit insertion of at least a portion of the mounting leg 35 and at least the lip portion 70 of the support platform 32 into the interface 21 between two opposed surfaces 27, 28 of the structure 23 (e.g., the bed assembly, a couch, etc.).

The frame assembly 33 further includes a skeletal metallic support frame 71 that functions to provide structural rigidity and support between the one or more mounting legs 35 and the support platform 32. As best viewed in FIGS. 6 and 7, this support frame is also primarily D-shaped, having an arch-shaped outer support element 72, preferably conforming to the foot print of the support platform 32, although not necessary. Two or more cross-members 73 extend laterally across the outer support element 72 that are either fastened, welded or integrally formed therewith for rigid support.

In accordance with the present invention, the one or more mounting legs 35, 35' each extend generally perpendicular to the two or more cross-members 73, and that are formed and dimensioned for movement between the stowed positions (FIGS. 2 and 6) and deployed position (FIGS. 1, 7 and 8). As will be described in greater detail below, in one preferred specific configuration, the one or more mounting legs 35, 35' are provided by a pair of spaced-apart support tubes 74, 74', disposed substantially parallel to one another, and a pair of corresponding leg portions 75, 75' slideably cooperating with the support tubes. These tubes 74, 74' are rigidly affixed to the cross-members 73, adding rigidity to the frame assembly 33.

Accordingly, not only do these support tubes 74, 74' provide a means for sliding reciprocal receipt of the corresponding leg portions 75, 75' therein, but also provide a means for mounting the frame assembly 33 to the support platform 32. In one specific embodiment, that is, each support tube 74, 74' includes a plurality of corresponding mounting brackets 76, 76' that mount the frame assembly 33 to the bottom of the support platform 32.

1.11 Inserted Position

The structure 23 upon which the pet bed apparatus 20 is cantilever side mounted can virtually be any device having a generally vertical side wall 22, and a generally horizontal interface capable of receiving the frame assembly. As best shown in FIG. 1, when the extended leg portions 75, 75' of the frame assembly 33 are fully manipulated toward the inserted position, the weight of the carrier device 30 and mounting assembly 31, plus an anticipated maximum weight of the pet occupant, can be fully cantilever supported between the interface 21. That is, in general, the primary contacting and weight bearing regions of the leg portions (i.e., generally the upper facing distal surfaces 77 of the extended leg portions 75, 75' that contact the downward facing surface 28 of the upper mattress 25, and the lower facing proximal surface 78 of the support tubes 74, 74' that contact the upward facing surface 27 of the lower mattress support 26) must be sufficiently stout to accommodate the maximum anticipated shear forces that may be encountered.

When the mounting assembly 31 is fully positioned in the inserted position, by sufficiently spacing the two support tubes 74, 74' and the corresponding leg portions 75, 75', laterally apart, rotational mounting stability of the pet bed apparatus 20 is maintained when cantilever mounted in the interface 21 of the structure 23 (e.g., the mattresses of a bed). That is, by sufficiently spacing the support tubes/leg portions apart laterally, they cooperate with one another, and the mattresses, to prevent undesirable spinning about a longitudinal axis of one or the other mounting legs 35, 35', when oriented in the inserted condition.

1.12 Mounting Leg Lengthening Techniques

Many techniques can be employed as a means to enable lengthening the mounting legs 35, 35' from the stowed position to the deployed position. Preferably, the leg portions 75, 75' are telescopically configured, slideably nested within the corresponding support tubes 74, 74', thereby significantly reducing its footprint in the stowed position, while maximizing its length extension in the deployed position (FIGS. 6 and 7).

Each support tube 74, 74' defines a respective central bore (not shown) extending longitudinally therethrough, that is sized and dimensioned for sliding reciprocation of the leg portion 75, 75' therein. Thus, it is only the leg portion 75, 75' that essentially slides and reciprocates between the stowed and deployed positions.

1.13 Preferred Cross-Bar

Extending between the leg portions 75, 75' is a cross-bar 80 that provides structural and lateral stability to the assembly, while further enabling both leg portions 75, 75' to be extended and retracted, together as a unit, between the stowed and deployed positions. Thus, the cross-bar not only provides structural integrity to the mounting assembly, but also functions as a handle member to enable simultaneous manipulation and operation of both leg portions 75, 75', together as a unit, between the stowed and deployed positions. The handle member may include a friction fit foam or rubber cover may be included that reduces movement of the platform from the bed, when in the inserted position.

Employing a telescopic mechanism similar to the telescopic handle extensions of rolling luggage, the cross-bar 80 may extend across, and be fixedly attached to, the distal ends of the leg portions 75, 75'. The placement of the cross-bar 80 along the leg portions, however, may of course be oriented at other locations longitudinally therealong. The telescopic mechanism may also include a latch or lock mechanism (not shown) for selective and/or automatic locking of the leg portions 75, 75' relative to the outer support tube 74, 74', in either the stowed position and the deployed position. Such a lock mechanism may be button operated at a handle portion of the cross-bar 80, by way of example, to prevent inadvertent extension of the leg portions 75, 75', and/or retraction thereof, especially during insertion of the extended mounting legs 35, 35' into the interface 21 toward the inserted position.

1.14 Length of Frame Assembly

Preferably, the collective longitudinal length of the frame assembly 33 is in the range of about 3" to about 4", in the deployed position, while the length of the cross-bar is such that the respective leg portions 75, 75' are about 2" to about 6" from the outer edges of the support platform 32. These lengths, in general, have been selected for lateral and rotational stability of the carrier device during cantilever mounting in the insertion position. Thus, depending upon the selected size of the carrier device (i.e., small, medium or large), the collective length and lateral spacing of the frame assembly, in the deployed position, may vary. At the same time, such a length of the leg portions, in the stowed position, is not too long so as to diminish the small overall footprint of the pet bed assembly base. As a general rule, the length of the leg portions 75, 75', in the deployed position is about three times the depth of the carrier device 30, as shown in FIG. 1.

To maximize the collective length of the frame assembly 33, in the deployed position, it will be understood that the length of each leg portion 75, 75' should be substantially the same as that of the outer support tube 74, 74'. In this manner, of course, the full length of the central bore is efficiently utilized, reducing the length of the support tube as well.

It will further be appreciated that multiple telescopic extensions can be employed, of course, to reduce the length footprint of each mounting leg 35, 35'. Although the total longitudinal length of the frame assembly could be increased, the costs and complexity to the frame assembly would significantly increase as well.

It will further be understood that the width dimension of the inner leg portions 75, 75' should be sufficient so as to minimize lateral movement thereof while reciprocating in the corresponding central bore of the support tubes 74, 74', while at the same time, being a sufficient to enable smooth sliding reciprocation therebetween. Such tolerances, for example, should again be similar to luggage grade telescopic handle mechanisms. Thus, the compositions of such telescopic leg portions include metals, fiberglass, graphite, plastics, etc., and further range in diameters from about ¾" to about 2".

1.15 Preferred Carrier Device is Removable

To facilitate portability, the carrier device 30 is configured to be easily removed from the mounting assembly 31. A variety of fasteners and/or latching mechanism 82 can be incorporated that enable simple and convenient, yet rigid and secure, mounting and dismounting of the carrier device 30 to and from the support platform 32 of the mounting assembly 31. As best illustrated in FIGS. 1-3, 12 and 13, one such fastening and/or latching device may be provided through a plurality of strap devices 83, having a conventional hook and loop fastener material such as VELCRO®, spaced peripherally about the carrier device side walls 36.

1.16 First Fastening Arrangement

In one example, as shown in FIGS. 2, 3 and 12, the latching mechanism 82 may incorporate a plurality of respective strap devices 83 disposed peripherally about the support platform 32 to mount the carrier device 30 to the mounting assembly 31. Each strap device 83 includes a first component 85 thereof vertically mounted a respective side wall 36 of the carrier device, and a corresponding loose (or dangling) second component 86 extending from the top portion of the first component 85 thereof. In the preferred embodiment, the first component 85 may incorporate a loop-type material 87 on its outward facing surface, while the inward facing surface of the second component 86 may include a hook-type material 88. It will be appreciated, of course, that the hook-type material and loop-type material can be easily reversed.

Accordingly, the second component 86 of each strap device 83 may be removably fastened to its own first component 85 thereof. This strap arrangement provides several advantages that enable mounting to multiple devices. For example, by incorporating a set of aligned mounting straps 90, each peripherally affixed to about the mounting assembly 31 and corresponding to a selected strap device, the carrier device 30 may be removably secured thereto. In another application, as above mentioned and as best shown in FIG. 14, these strap devices 83 can be operated to mount to, and cooperate with, the safety belts 93 of an automobile seat 92 for removable securement thereto.

Referring back to the primary fastening application of these straps, the flexible mounting straps 90 can be mounted to the support platform 32 of the frame assembly 33. Thus, when the carrier device 30 is seated atop the support platform 32, aligning the curved side wall 36 with that of the support platform 32, each aligned mounting straps 90 may be oriented in an upstanding manner, and positioned between the corresponding first component 85 and the second component 86 of each strap device 83. The inward facing surface of each mounting strap 90 may incorporate a corresponding hook-type material 88, while the opposite outwardly facing surface of each strap may incorporate a corresponding loop-type material 87. By attaching the hook-type material 88 of each mounting strap 90 to the corresponding loop-type material 87 of the strap device 83 of the carrier device, the mounting straps can be initially secured (FIGS. 2 and 3). Subsequently, by folding over the corresponding second components 86 of the respective strap devices 83, the hook-type material 88 thereof can be removably fastened to the corresponding loop-type material 87 of the mounting strap 90, securely sandwiching the mounting strap therebetween and, thus, securing the carrier device to the mounting assembly 31 (FIG. 12).

In another application of these strap arrangements, as mentioned, either strap enables removably fastening of the strap devices 83 to conventional safety belts 93 for secure transport of the carrier device 30 on the automobile seats 92. As shown in FIG. 14, the safety belt 93 in a conventional automobile may be inserted between the first component 85 and the second component 86 of the respective strap devices 83, wherein the second component is folded over and attached to the first component, securely sandwiching the safety belt therebetween. Hence, once the abutting wall 36' of the carrier device 30 is seated against the back rest portion 91 of the automobile seat 92, the safety belt 93 can then be wrapped peripherally around the carrier device side walls 36. Subsequently, the safety belt 93 may then be inserted between the strap device first and second components 85, 86, and affixed thereto, securing the carrier device to the vehicle seat.

A two-part positioning strap 98 facilitates positioning of the safety belt 93 across the collapsible hood 50. Preferably, as shown in FIGS. 5 and 14, the positioning strap 98 is disposed atop the upper web portion 55, at the reinforcement rib 51 and adjacent to the opening 61.

1.17 Second Fastening Arrangement

In another fastening arrangement, as best illustrated in FIGS. 1, 2 and 13, each strap device 83' may also be provided by a single strap, albeit vertically oriented in an opposite upside-down orientation with respect to the previous embodiments. That is, the loop-type material of the analogous first component 85' can similarly be vertically oriented against the carrier side walls 36, but the analogous second component 86', with the corresponding hook-type material, extends distally from the bottom of the first component 85'. In this mounting arrangement, each strap device 83' is configured to be cooperatively received in a bracket or loop 94 that is attached to the mounting assembly 31. Preferably, as shown, the receiving loops 94 may be mounted to the support frame 71 or support platform 32.

Hence, during mounting of the carrier device to the support platform, once aligned, the distal end of the second component 86' of the strap device 83' can be inserted through the corresponding loop 94. Once, fully inserted, each strap device 83' can be pulled up upon, drawing the carrier device snuggly against the support platform 32. Subsequently, each strap device second component 86 can be secured to its corresponding first component 85' in a fastened manner.

1.18 Mounting Pet Bed Apparatus to Bed

To cantilever mount the pet bed apparatus 20 to a structure 23, such as a conventional bed, the leg portions 75, 75' are slideably telescoped to their deployed position (FIGS. 1, 7 and 8), where the locking mechanism secures the mounting assembly in place. Subsequently, the leg portions 75, 75' and frame assembly 33 can be inserted into the interface 21, between the mattresses and slid inwardly fully toward the insert position (FIG. 1). In this orientation, the lip portion 70 of the support platform 32 is also slid between the mattresses, further augmenting mounting stability. The depth that the lip portion 70 slides between the mattresses is preferably in the range of about 6" to about 10", until the abutting side wall 36' of the carrier device 30 seats in an abutting manner against the corresponding side wall 22 of the upper mattress. Accordingly, in this arrangement, the pet bed apparatus can be securely cantilever mounted into the interface of the mattresses.

1.19 Optional Support Leg

For additional vertical support and stability, especially when the larger carrier device 30 is employed, likely housing a larger, heavier, pet occupant, the frame assembly 33 may further include a vertical support leg 95 (FIGS. 6, 8 and 9). As shown, this vertical support leg 95, disposed under the support platform 32, is preferably configured to articulate between a stored position (FIG. 6), generally oriented parallel and adjacent to the bottom surface of the support platform, and a support position (FIGS. 8 and 9), generally oriented perpendicular to the bottom surface of the support platform 32 for contact and support against the ground. Accordingly, depending upon the vertical height of the interface 21 from the ground, by adjust the height of the vertical support leg 95 to supportively contact the ground, the support leg can provided structural support and stability to the pet bed apparatus 20.

In on specific embodiment, the support leg 95 may include a central support bar 96 and a cross-bar 97 coupled to the distal end of the support bar. Collectively, the support leg 95 forms an inverted T-shape having the bottom cross-bar 97 that is configured to supportively contact the ground, in the support position. A proximal end of the support bar is hingedly mounted to the frame assembly 33 for selective articulation between the stored position and the support position. The support bar 96 may be telescopic, similar to the leg portions 75 of the mounting assembly, to accommodate different bed heights, for instance.

2. Second Preferred Pet Bed Apparatus

A second preferred pet bed apparatus is shown in FIGS. 15-18.

Referring now to FIG. 15, an alternative embodiment pet bed apparatus 20 is illustrated, comprising a lightweight, one piece design. In the most simplistic embodiment, both the carrier device 30 and the mounting assembly 31 may be provided by a wire or plastic mesh material, either integrally formed or fastened together at the bottom of the carrier device.

The carrier device 30, for example, may be provided by a circular, oval or rectangular basket, defining the bedding space 29 therein. To add structural support to the carrier device 30, an upper rim frame 98 and a spaced lower rim frame 99 are provided upon which the spanning mesh material 100 is attached.

Similar to the previous embodiments, a fabric bedding material or the like (not shown) may be disposed in the carrier device bedding space, having a poly filled fabric liner. The upper portion of the liner may be folded over the upper rim frame 99 of the carrier device 30, and secured around the bottom edge with either an elastic band, ribbon or fabric tie.

In this embodiment, the mounting assembly 31 may be provided by a single piece wire or plastic mesh frame assembly 33 in the shape of a tongue that extends horizontally outwardly from the bottom wall of the carrier device 30. This one-piece frame assembly 33 functions to both provide vertical support to the carrier device 30, as well as functioning to support the carrier device in the cantilever mounted orientations when it is inserted between bed assembly interface. That is, the distal portion of the one-piece frame assembly 33, extending under the carrier device 30 (analogous to the support platform 32 in the above embodiments), while the proximal portion of this frame assembly 33 is configured for selective friction-fit insertion of at least a portion thereof to the inserted position between the bed assembly (analogous to the extended mounting legs 35, 35' in the above embodiments).

In one configuration of this embodiment, the frame assembly 33 includes an outer circumferential support frame 101 extending peripherally around a wire or plastic mesh material 102 that spans the enclosed area defined thereabout. This support frame 101 is preferably tubular, and composed of metal or plastic, or other comparable rigid material. The diameter of the tubular frame of course depends upon the material composition thereof, but must be sufficient to easily accommodate the anticipated maximum weight of the pet occupant and the carrier device, in the cantilever supported manner.

Alternatively, the frame assembly 33 of the lightweight embodiment of FIG. 15 may be provided by a detachable two-piece configuration (i.e., a proximal frame assembly 103, and a distal frame assembly 104) that can be manually manipulated between a detached stowed position (FIG. 17) and an assembled deployed position (FIGS. 16 and 18). In the stowed position, in particular, a proximal circumferential support frame 101A of the proximal frame assembly 103 is detachable from a distal circumferential support frame 101B of the distal frame assembly 104, reducing the longitudinal length of the frame assembly 33 and, thus, the overall footprint of the pet bed apparatus 20. As mentioned above, this position facilitates transport and storage of the pet bed apparatus.

In the assembled deployed position (FIGS. 16 and 18), the proximal circumferential support frame 101A of the proximal frame assembly 103 attachably cooperates with the distal circumferential support frame 101B of the distal frame assembly 104, longitudinally extending the frame assembly 33 outwardly from the distal frame assembly. The length of this extension is by an amount sufficient to enable the bed apparatus to cantilever mount to the mounting structure (e.g., a bed apparatus) when the proximal frame assembly 103 is friction-fit inserted into the structure interface (not shown in FIGS. 16-20) until at least a proximal portion of the distal frame assembly 104.

As best viewed in FIG. 17, each of the proximal circumferential support frame 101A and the distal circumferential support frame 101B is generally U-shaped, and disposed in an opposed relationship to one another when attached together in the assembled deployed position (FIGS. 16 and 18). Generally, each frame portion 101A, 101B includes a pair of spaced-apart support tubes 105A, 105A' and 105B, 105W, and corresponding central bight portions 106A, 106B coupling the support tubes therebetween. To provide further support and stability, each circumferential support frame 101A, 101B includes a respective cross-member 107 A, 107B that rigidly couples the opposed ends of the corresponding support tubes 105A, 105A' and 105B, 105B' together, forming a rigid peripheral frame for each circumferential support frame.

Similar to the embodiment of FIG. 15, a wire or plastic mesh material 108A, 108B is disposed between the enclosed areas of the proximal circumferential support frame 101A and the distal circumferential support frame 101B, providing further support. With respect to the distal circumferential support frame 101B and mesh material 108B of the distal frame assembly 104, mounting support must be provided to support the carrier device 30 thereatop.

Preferably, the carrier device 30 is removably mounted to the distal circumferential support frame 101B by applying any of the mounting techniques above-mentioned. As best viewed in FIGS. 16-18, the above-mentioned VELCRO®—style latching mechanisms 82 may be applied. For instance, the distal circumferential support frame 101B may incorporate loops 94, which are aligned to cooperate with corresponding mounting straps 83 on the carrier device 30.

To attach and detach the proximal circumferential support frame 101A of the proximal frame assembly 103 to the distal circumferential support frame 101B of the distal frame assembly 104, corresponding coupling mechanisms 110, 110' cooperate between the opposed ends of the pair of spaced-apart support tubes 105A, 105A' and 105B, 105B'. The coupling mechanisms 110, 110' are manually operable between a release position (FIG. 17), enabling separation of the proximal frame assembly 103 from the distal frame assembly 104, and a locked position (FIGS. 16 and 18), releasably locking the frame assemblies therebetween.

One particularly suitable coupling mechanism 110, 110' is a conventional biased ball bearing-type snap connection, each of which includes a male insertion end 111, 111', on one end of the support tubes 105A, 105A' and 105B, 105B', and a female receiving end 112, 112'. on the end of the other support tubes 105B, 105B' and 105A, 105A'. As best illustrated in FIG. 17, in one particular example, the insertion end is provided by respective insertion finger portions 111, 111' protrude outwardly from the ends of distal support tubes 105B, 105B' the distal frame assembly 104. These insertion fingers 111, 111', preferably have a diameter less than that of the corresponding support tube, and are more preferably sized and dimensioned for friction-fit insertion into the corresponding receiving ends or sockets 112, 112' on the end of the other of the proximal support tubes 105A, 105A', respectively. When these support tubes 105A, 105A' and 105B, 105B' are respectively coupled together, in the locked position (FIGS. 16 and 18), they collectively form the extended mounting legs 35, 35' for secure positioning in a structure interface for cantilever mounting thereof.

Accordingly, in this specific embodiment, the support tube ends of the proximal support platform portion 104 define the receiving sockets 112, 112' that are formed and dimensioned for sliding, friction-fit receipt of the corresponding insertion fingers 111, 111' therein.

Each coupling mechanism 110, 110' may include a lock device (not shown) that is biased to automatically lock the coupling mechanisms in the locked position once each insertion finger 111, 111' is fully inserted, and engaged, into the corresponding receiving sockets 112, 112'. One conventional lock device, by way of example, may be provided by a simple outwardly biased ball bearing-type key device disposed on the respective insertion finger. This key device is aligned to engage a corresponding recess formed in the support tube receiving socket. Other conventional locking devices include threaded locking devices, or even just a friction-fit mounting.

3. Third Preferred Pet Bed Apparatus

A third preferred pet bed apparatus 320 is shown in FIGS. 19-28. The third preferred pet bed apparatus 320 is best understood in the context of the first two embodiments.

The first preferred pet bed apparatus 20 is a two-piece design. As best shown in FIG. 1, it is a two-piece assembly that includes a carrier device 30 and a mounting assembly 31 for detachably supporting the carrier device 30, in a cantilevered arrangement, next to a user's bed (or other structure 23). In a bit more detail, the mounting assembly 31 features a support platform 32 and the carrier device 30 is detachably connected to the support platform 32 with, for example, Velcro® straps.

The second preferred pet bed apparatus 20 (same number) is a one-piece design. As best shown in FIG. 15, it is provided as a one-piece assembly that includes a carrier device 30 (same number) and a mounting assembly 31 (same number) that are formed, for example, from a wire or plastic mesh material, either integrally formed or fastened together at the bottom of the carrier device 30.

The first and second embodiments offer significant advantages as described above, but there are still some issues that could be resolved or improved. In the first embodiment, for example, when the carrier device 30 is detached from the mounting assembly 31, the mounting assembly's support platform 32 is still extending from the bed structure 23. As such, the user may inadvertently contact the platform 32 while walking around the bed 23. In the second embodiment, it is not possible to separate the carrier device 30 from the mounting assembly 31.

The first and second embodiments represent significant advancements, but there remains a need for an embodiment that has a detachable carrier device like the first embodiment, but is simpler to operate and does not leave a platform extending from the bed when the carrier device is detached.

FIG. 19 is a schematic cross-sectional view of a pet bed apparatus 320 constructed in accordance with a third preferred embodiment of the present invention that includes a carrier device 330 and a mounting assembly 350 having a horizontal portion 351 and a vertical portion 352. FIG. 20 is an exploded schematic view of the pet bed apparatus of 320 of FIG. 19 showing how the connector assembly 380 is generally formed from two interoperating portions 381, 382 of any suitable configuration.

The carrier device 330 is connected to the mounting assembly 350 via any suitable connector assembly 380. The exact configuration of the connector assembly 380 is amenable to many different arrangements. The benefit of this embodiment is that the vertical portion 352 of the mounting assembly 350 is substantially flush with the side of the bed when the carrier device 330 is removed;

FIG. 21 shows a third preferred pet bed apparatus 320 (with bedding) supporting a user's dog (not numbered). The third pet bed apparatus 320, like the first two embodiments, mounts to and extends from the side of a user's bed 23 having, in this particular case, a mattress 25 and a box spring 26.

FIG. 22 is an exploded view of the user's bed 23 and pet bed apparatus 320 of FIG. 21, but with all of the bedding removed for the sake of clarity. As shown, the pet bed apparatus 320 features a carrier device 330 and a mounting assembly 350 extending from its side. As with the other embodiments, and as suggested by the dashed line and associated arrowhead, the mounting assembly 350 slides into the interface 21 between the mattress 25 and the box spring 26, ultimately mounting the carrier device 330 to the side of the bed 23 as shown in FIG. 21.

FIG. 23 goes one step beyond FIG. 22 in that it shows the pet bed apparatus 320 adjacent to and abutting the side of the user's bed 23, after the mounting assembly 331 (not visible) has been fully inserted into the interface 21 between the mattress 25 and the box spring 26.

FIGS. 24A and 24B are normal and exploded perspective views of the pet bed apparatus 320 of FIG. 21 as viewed from a bed-facing side thereof, showing how the carrier device 330 interfaces with the mounting assembly 350 via a connector assembly 380 formed from a tubular end portion 381 of the mounting assembly 350 and a corresponding channel portion 382 on the side of the carrier device 330.

As best shown in FIG. 24B, the preferred mounting assembly 350 generally consists of a horizontal portion 351 and a vertical portion 352. The preferred mounting assembly 350 is a tubular assembly that is formed from two sections of metal tubes (e.g. steel, aluminum, etc.) including: (1) a supporting section 360, and (2) a telescoping section 370. The supporting section 360 comprises two mounting legs 361, 361 that are parallel to one another, and a pair of substantially vertical uprights 362, 362 that are connected by cross member 363.

The two vertical uprights 362, 362 and cross-member 363 collectively form the interoperating portion 381 of the connector assembly 380.

The telescoping section 370 is formed from a pair of leg portions 371, 371 that are parallel to one another and are connected by a cross-bar 372 that provides structural and lateral stability to the overall mounting assembly 350 while enabling the leg portions 377, 371 to be extended and retracted, as a unit, relative to the supporting section 360. In the preferred mounting assembly 350, the telescoping section 370 has a smaller diameter than the supporting section 360, but the opposite could be true. The leg portions 371, 371 of the telescoping section 370 each carry a spring button 378, 378 and the mounting legs 361, 361 of the supporting section 360 each havpppe a corresponding hole 368, 368 to provide a locking arrangement.

As also best shown in FIG. 24B, the preferred carrier device 330 has four side walls 331, a bottom wall 332, a lower periphery member 340, and an upper periphery member 340. The lower and upper periphery members 340, 340 preferably have an L-shaped profile to form a horizontal ledge and a vertical wall. In the preferred embodiment, the bottom wall 332 is formed from a perforated metal sheet (not separately numbered) that is supported on the horizontal ledge of the lower periphery member 340, and the four side walls 331 are formed from a single perforated metal sheet (not separately numbered) that is folded into shape, connected together along an overlapping seam 333, and supported between the vertical walls of the upper and lower periphery members 340.

In more detail, the upper and lower periphery members 340 comprise L-shaped extrusions that are formed into a substantially rectangular shape with radiused corners. The bottom wall 332 is secured to the lower periphery member 340 with suitable fasteners (e.g. rivets 335), a single sheet of perforated metal is bent into the illustrated shape and secured to the lower periphery member 340 with similar fasteners, and then the upper periphery member 340 is secured to the upper edge of the four sides walls 331 with rivets 335. Finally, as shown in FIG. 24B, a side mounting mechanism 382 is provided on the bed-facing side of the carrier device 330.

As shown, the preferred side mounting mechanism 382 comprises a metal channel 382 having a U-shaped profile, and is bent into substantially rectangular shape with radiused corners. The metal channel 382 is attached (e.g. by rivets 335) to the lower and upper periphery member 340, 340 of the carrier device 330. The metal channel 382 has a substantially U-shaped profile for receiving the uprights 362, 362 and cross-member 363 that form the other half 381 of the overall connecting assembly 380 (see FIG. 24A). The U-shaped profile of the metal channel 382 defines a front wall 386 that faces side wall 331, a perimeter wall 387, and a back wall 388. The back wall 388 has two notches 389 near the bottom so that the mounting legs 361, 361 of the mounting device 350 can protrude horizontally therefrom when the carrier device 330 is connected to the mounting assembly 350 as shown in FIG. 24A.

FIGS. 25A and 25B are exploded perspective views showing how the preferred pet bed apparatus 320 further includes a cover 390 (e.g. of cloth) that visually and physically conceals the hole on the vertical portion 352 of the mounting assembly. When the carrier device 330 is disconnected from the mounting assembly 350, the vertical portion 352 of the mounting assembly 350 remains closely against but still adjacent to the bed 23. The cover 390 helps hide the hole in the vertical portion 352, making the overall pet bed apparatus 320 more attractive, and makes it less likely that the user will inadvertently step into the hole.

FIG. 26 is an exploded view of the pet bed apparatus 320 showing the preferred bedding components 391 to 394 and how they are attached to the carrier device 330. First, a padded liner 391 is rolled over the side walls of the carrier device 330. Then, a decorative cover 392 is rollver over the liner 391. Then, a foam pad 393 is inserted into the decorative cover 392. Lastly, a pillow 394 is placed on top of the foam pad 393. The result is a comfortable pet carrier device 320 as suggested by FIG. 21. The bedding components can vary substantially from those shown.

FIGS. 27 and 28 show two mounting assemblies 350 having slightly different angles between the horizontal portion 351 and the vertical portion 352. FIG. 27 is a side view of the mounting assembly 350 used in a pet bed apparatus 320 designed for an extra small (XS) or small (S) carrier device, the vertical portion 352 extending from the horizontal portion 351 at about a 90 degree angle. In such extra small (XS) or small (S) case, the overall weight of the carrier device 330 and supported pet is relatively small. FIG. 28, by contrast, is a side view of the mounting assembly 350 used in a pet bed apparatus 320 designed for a medium (M) or large (L) carrier device, the vertical portion 352 extending from the horizontal portion 351 at about a 93 degree angle to account for the additional weight of the larger carrier device and occupying pet. The exact angles provided may vary with further experimentation.

4. Fourth Preferred Pet Bed Apparatus

A fourth preferred pet bed apparatus 420 is shown in FIGS. 29A to 34. The fourth preferred pet bed apparatus 420 is very similar to the third preferred pet bed apparatus 320, so it can be best understood by focusing on the differences. The pet bed apparatus 320 described avpve can be used with conventional beds 23 like that shown in FIG. 21. However, because the bottom of the carrier device 330 is at or near the horizontal portion 351 when connected to the connecting assembley 350 (see FIG. 24B), it cannot be used with certain beds (e.g. a platform bed) where the interface between the mattress and the next lower component is surrounded by a vertical wall. The fourth pet bed apparatus 420 is designed to be more versatile.

In the pet bed apparatus 420, as shown in FIGS. 29A and 29B, the height of the mounting assembly 450 exceeds the height of the carrier device 430 to create a gap 421 beneath the carrier device. 340.

FIGS. 30 and 31 illustrate the relative heights of the mounting assembly 450 and of the carrier device 430 in more detail. As shown, the connecting assembly's vertical portion 452 has a height of about 12" whereas the carrier device 430 has a height (aka "depth") of about 9".

The result, as shown in FIG. 32, is the formation of a gap 421 below the carrier device 430 when it is connected to the mounting assembly 450. With relative heights of 12" and 9", the gap 42 is, of course, about 3".

FIG. 33 shows how the pet bed apparatus 420 can be mounted to a conventional bed 23 having a mattress 25 supported by a box spring 26 and a steel bed frame 27, just as with the third pet bed apparatus 320 as shown in FIG. 21

FIG. 34 shows the same pet bed apparatus 420 is versatile in that it can also be mounted to platform bed 23' having a mattress 25 supported by a platform 27' made, for example, of wood—the gap 421 permitting such installation.

It will be further understood from the foregoing description that various modifications and changes may be made in the preferred and alternative embodiments of the present invention without departing from its true spirit.

What is claimed is:

1. A portable pet bed apparatus configured for cantilever supportive retainment at an interface between two opposed, substantially adjacent, opposed surfaces of a structure, said pet bed apparatus comprising:
    a carrier device defining a bedding space sized and dimensioned to accommodate a domestic pet therein,
    a mounting assembly including a horizontal portion with a proximal end and a distal end, and a vertical portion extending upward from the proximal end of the horizontal portion, the horizontal portion configured to enable selective insertion between the opposed surfaces, to an inserted position, in a manner enabling the vertical portion to be closely adjacent to a side wall of the structure; and
    a connector assembly on a side of the carrier device for detachably connecting the carrier device to the vertical portion of the mounting assembly, in a manner enabling cantilever supportive retainment of the pet bed apparatus to the side wall of the structure.

2. The pet bed apparatus according to claim 1, wherein
    the mounting assembly comprises a tubular assembly with the vertical portion formed from two substantially upright members and a cross-member; and
    the connector assembly comprises a metal channel located on the side of the carrier device and configured to surround the vertical portion of the mounting assembly.

3. The pet bed apparatus according to claim 1, further including:
    said mounting assembly comprises a tubular assembly that is configured for selective manipulation between a stowed position and a deployed position, sufficiently extended from a side portion of the carrier device, to enable selective friction-fit insertion of at least a portion of said frame assembly into the interface, between the opposed surfaces, to the inserted position.

4. The pet bed apparatus according to claim 3, wherein
    said frame assembly includes a pair of mounting legs, laterally spaced apart from one another.

5. The pet bed apparatus according to claim 4, wherein
    said mounting legs are configured to telescopically translate between the stowed position and the deployed position.

6. The pet bed apparatus according to claim 4, wherein
    each said mounting leg is detachable for orientation from the deployed position to the stowed position.

7. The pet bed apparatus according to claim 1, further including
    a support leg extending from said carrier device to the ground for additional vertical support of the pet bed apparatus when oriented in the inserted position.

* * * * *